(12) United States Patent
Hideshima et al.

(10) Patent No.: US 12,535,717 B2
(45) Date of Patent: Jan. 27, 2026

(54) DRIVE DEVICE AND OPTICAL DEVICE

(71) Applicant: FUJIFILM Corporation, Tokyo (JP)

(72) Inventors: Masahiro Hideshima, Saitama (JP); Masahiko Miyata, Saitama (JP); Shinji Otsuka, Saitama (JP); Takeya Abe, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 341 days.

(21) Appl. No.: 18/187,551

(22) Filed: Mar. 21, 2023

(65) Prior Publication Data
US 2023/0305364 A1 Sep. 28, 2023

(30) Foreign Application Priority Data

Mar. 28, 2022 (JP) ................. 2022-051666

(51) Int. Cl.
| | |
|---|---|
| G03B 13/36 | (2021.01) |
| G03B 5/02 | (2021.01) |
| H02K 11/02 | (2016.01) |
| H02K 11/21 | (2016.01) |
| H02K 41/035 | (2006.01) |

(52) U.S. Cl.
CPC ............. *G03B 13/36* (2013.01); *G03B 5/02* (2013.01); *H02K 11/02* (2013.01); *H02K 11/21* (2016.01); *H02K 41/0354* (2013.01); *G03B 2205/0046* (2013.01); *G03B 2205/0069* (2013.01)

(58) Field of Classification Search
CPC .... G03B 2205/0015; G03B 2205/0046; G03B 2205/0069; G03B 5/00; G02B 7/09; G01B 7/003
See application file for complete search history.

(56) References Cited

U.S. PATENT DOCUMENTS

| | | | | |
|---|---|---|---|---|
| 2013/0088607 A1* | 4/2013 | Akutsu | ............. | H02K 41/0356 348/208.1 |
| 2013/0120862 A1 | 5/2013 | Hase | | |
| 2016/0103297 A1* | 4/2016 | Kobayashi | ............... | G02B 7/08 359/824 |

(Continued)

FOREIGN PATENT DOCUMENTS

| | | |
|---|---|---|
| JP | 3765825 B1 | 4/2006 |
| JP | 2011-118259 A | 6/2011 |

(Continued)

OTHER PUBLICATIONS

An Office Action; "Notice of Reasons for Refusal," mailed by the Japanese Patent Office on Sep. 30, 2025, which corresponds to Japanese Patent Application No. 2022-051666 and is related to U.S. Appl. No. 18/187,551; with English language translation.

*Primary Examiner* — Brandi N Thomas
(74) *Attorney, Agent, or Firm* — Studebaker Brackett PLLC

(57) ABSTRACT

A drive device includes a magnetic circuit unit including a first yoke, a second yoke, and a first magnet, a magnetic circuit unit including the first yoke, the second yoke, a second magnet, a first coil that is bonded to a focus lens, in which the magnetic circuit units drive the first coil and the focus lens by an electromagnetic force generated in the first coil, the first magnet corresponds to a first movement amount of movement of the focus lens, and the second magnet corresponds to a second movement amount of movement of the focus lens.

12 Claims, 24 Drawing Sheets

(56) References Cited

U.S. PATENT DOCUMENTS

2016/0147037 A1  5/2016 Arai et al.
2019/0064475 A1  2/2019 Kobayashi
2021/0231906 A1  7/2021 Saito et al.

FOREIGN PATENT DOCUMENTS

| JP | 2011-237507 A | 11/2011 |
| JP | 5866487 B2 | 2/2016 |
| JP | 2016-099513 A | 5/2016 |
| WO | 2017/187933 A1 | 11/2017 |
| WO | 2019/208227 A1 | 10/2019 |

\* cited by examiner

FIG. 14
(A)
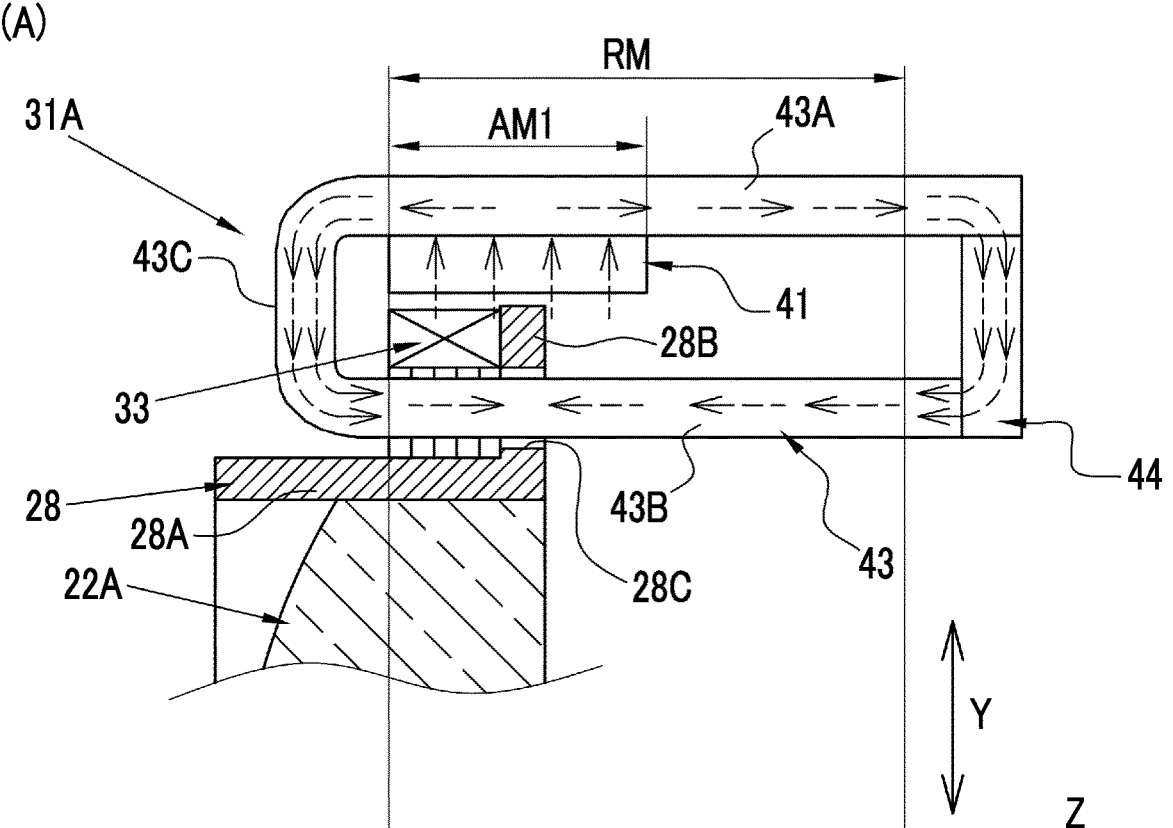
(B)
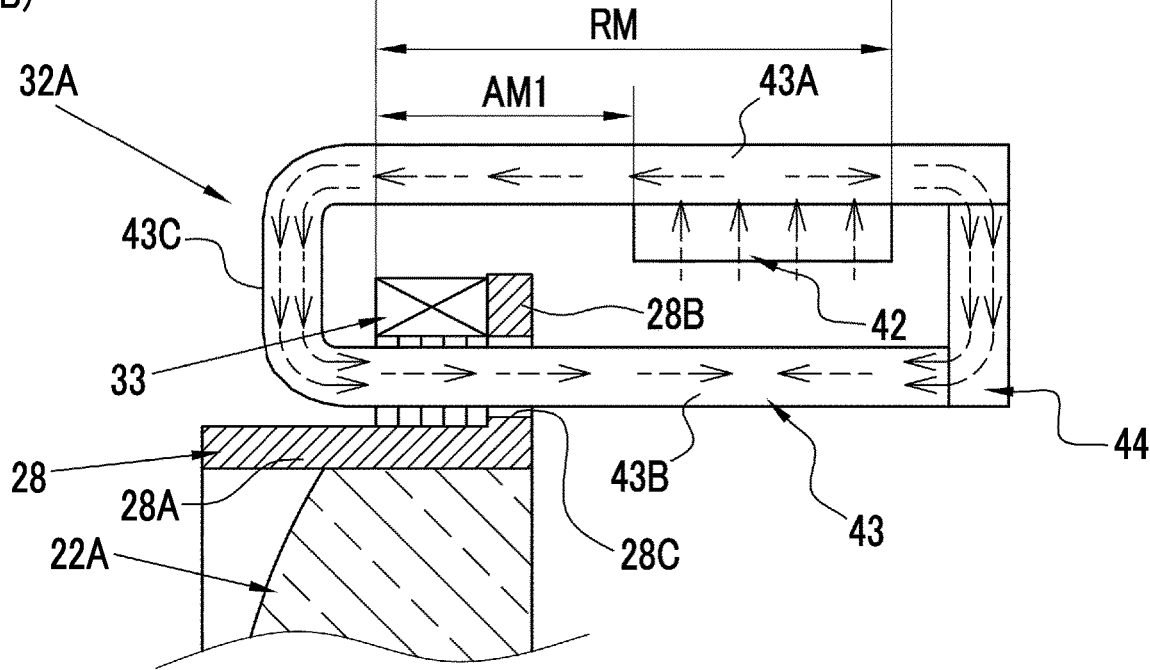

FIG. 15
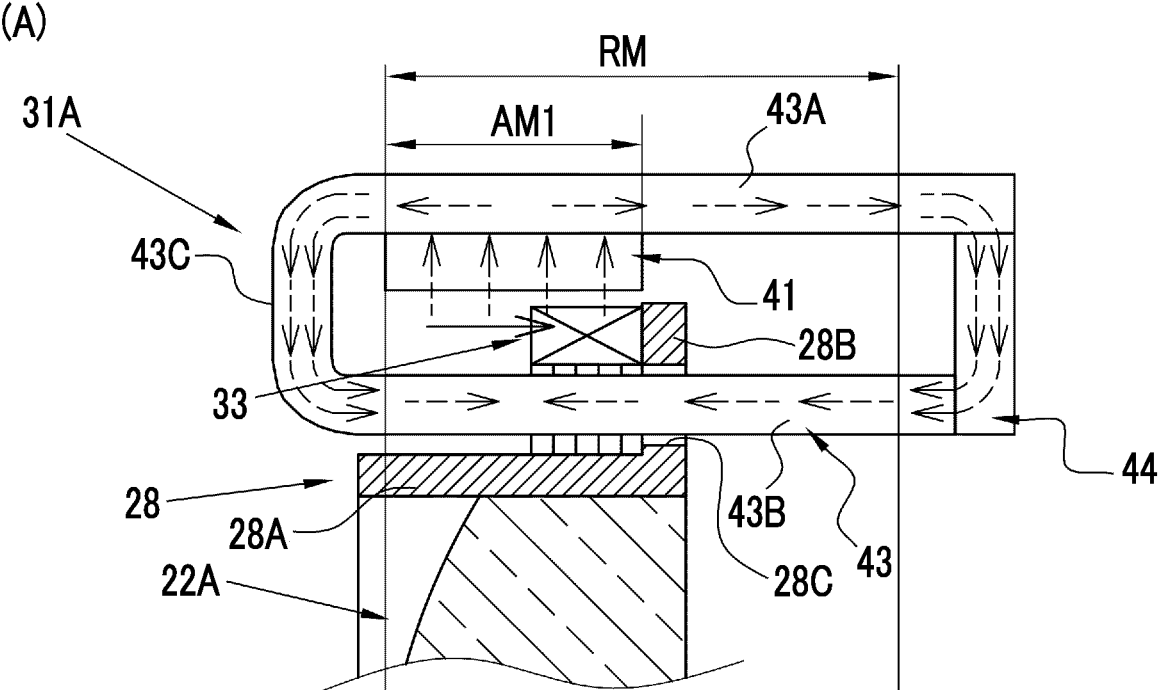
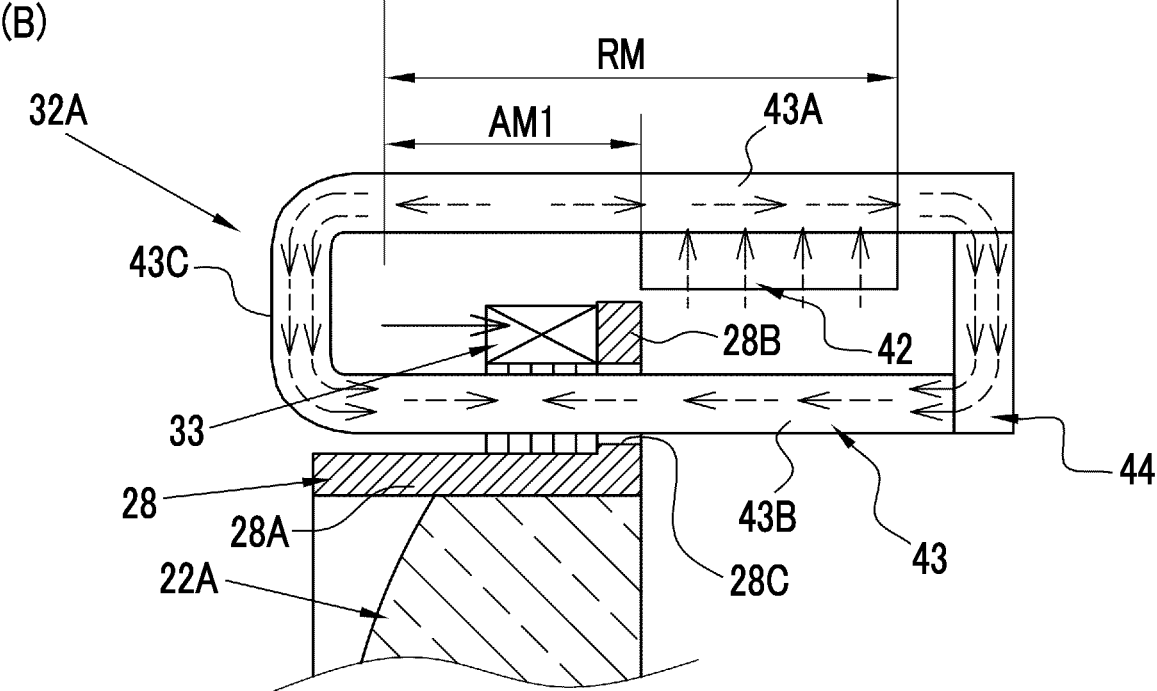

FIG. 16
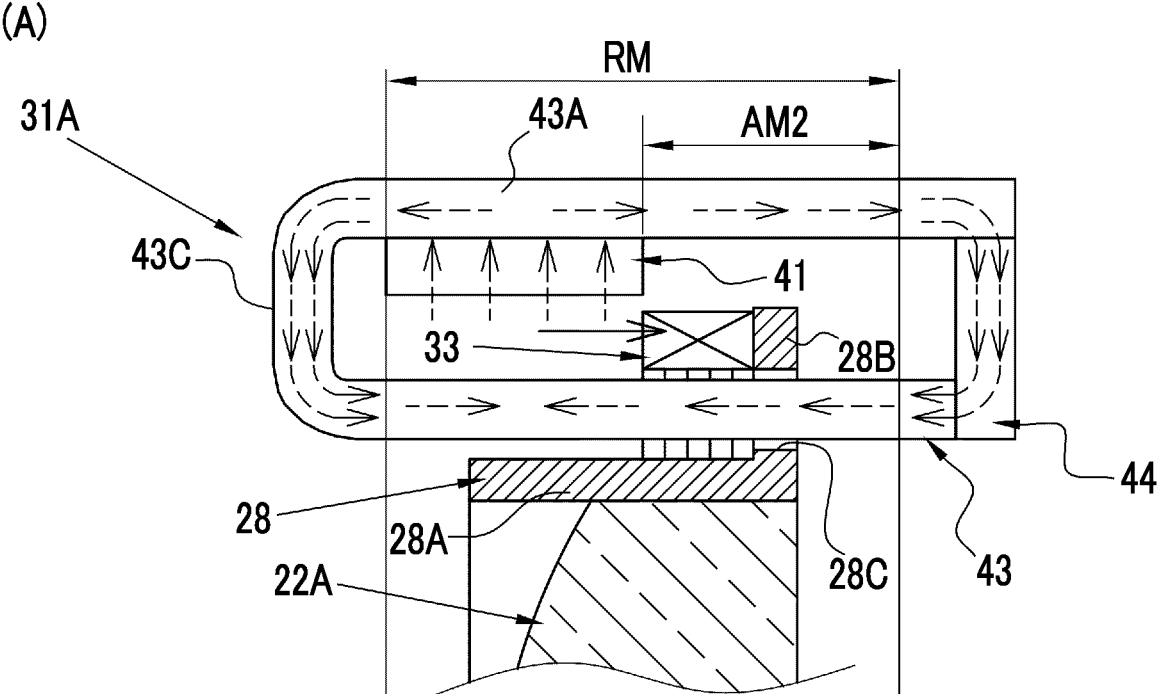
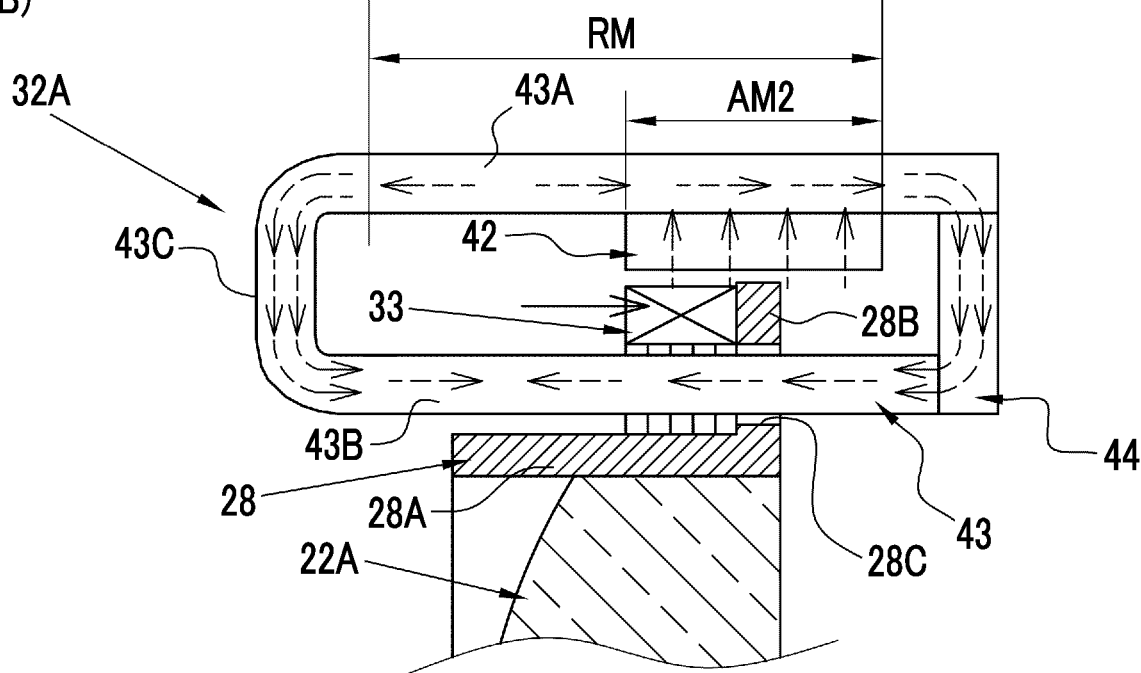

FIG. 17
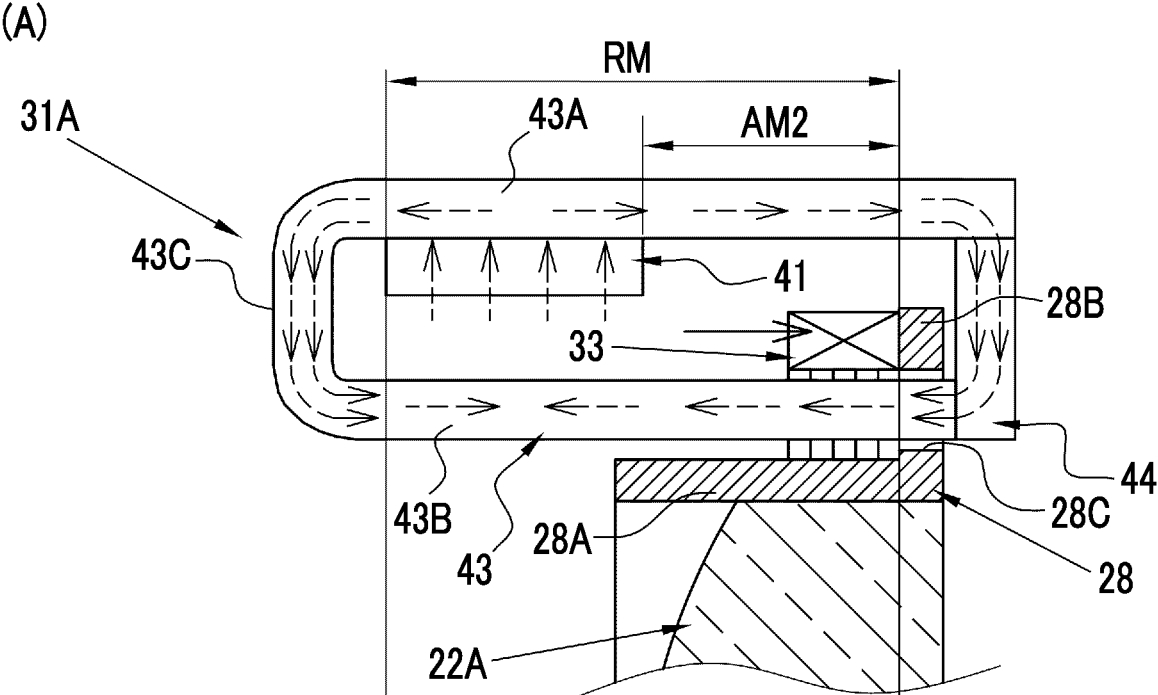
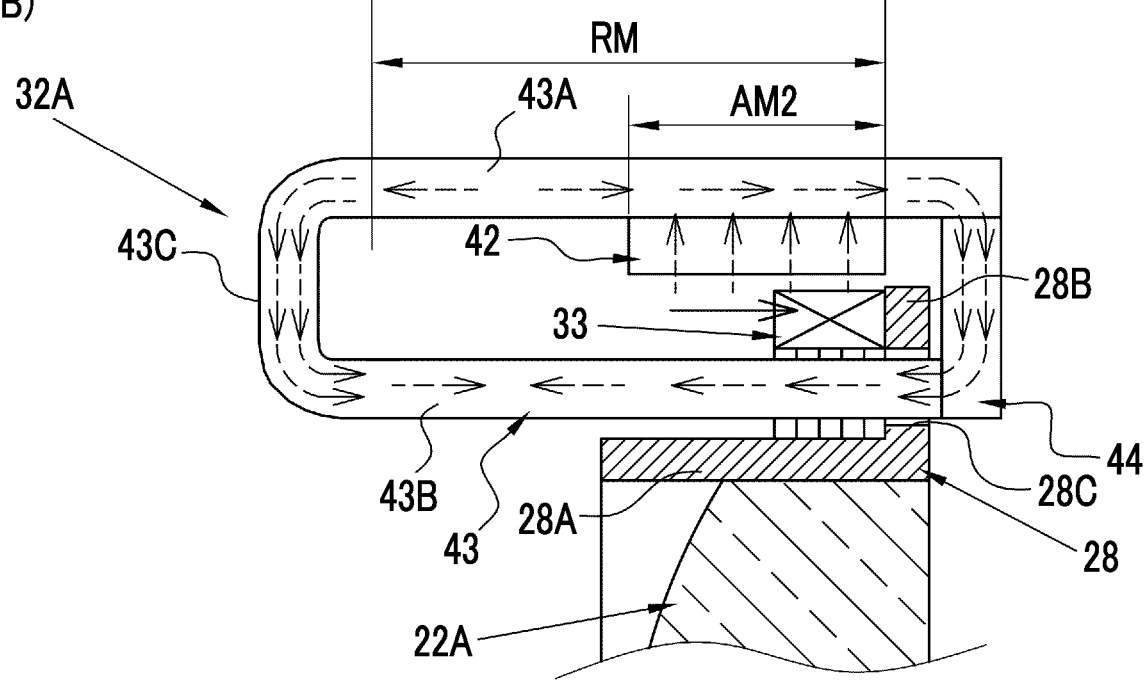

FIG. 21
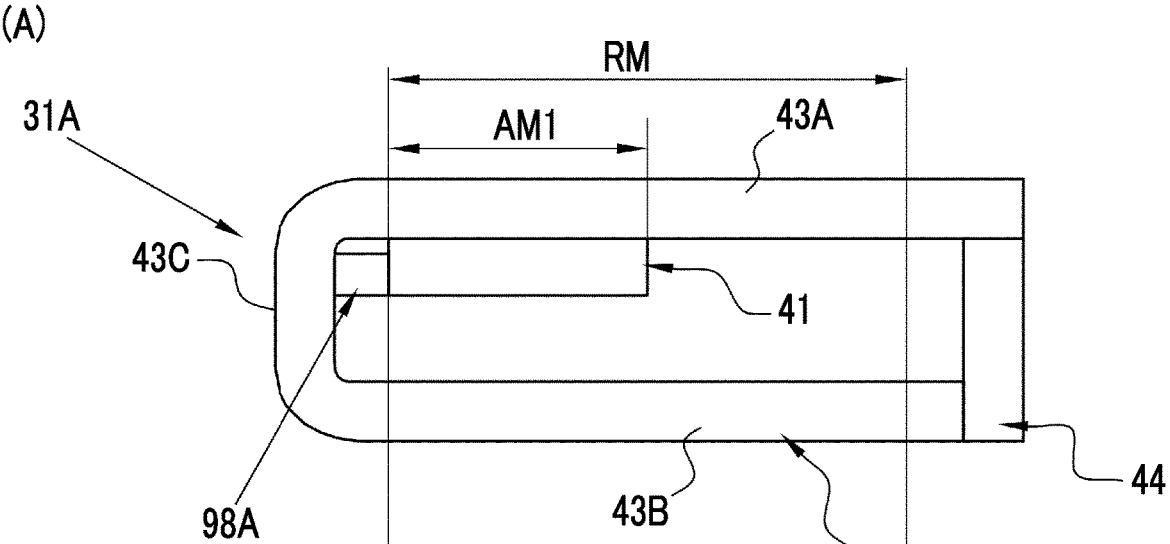
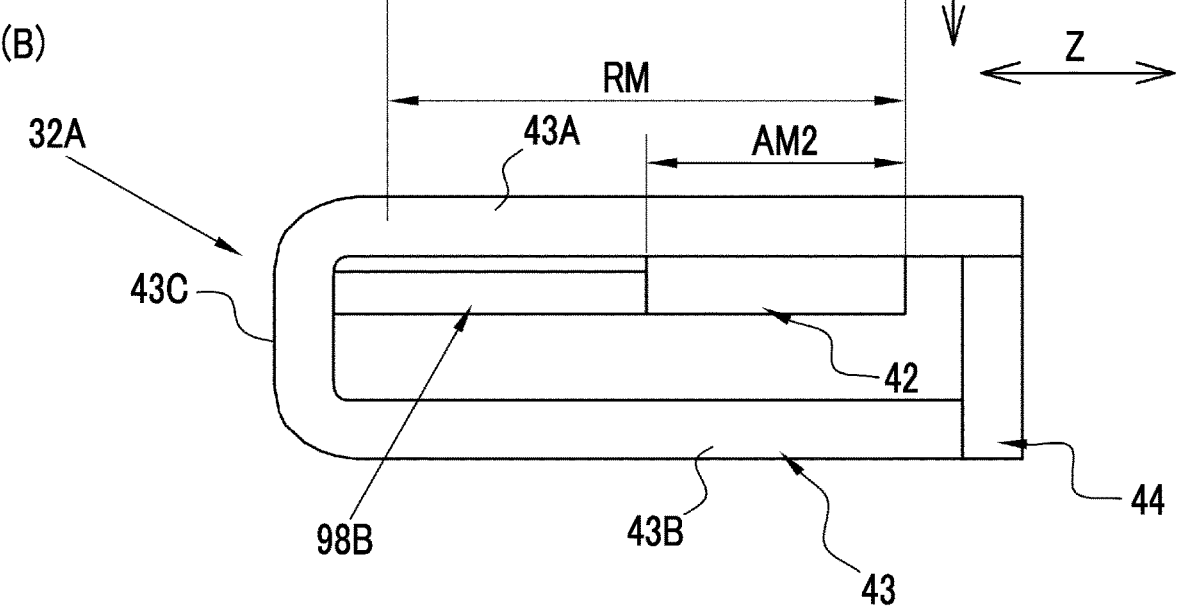

FIG. 22
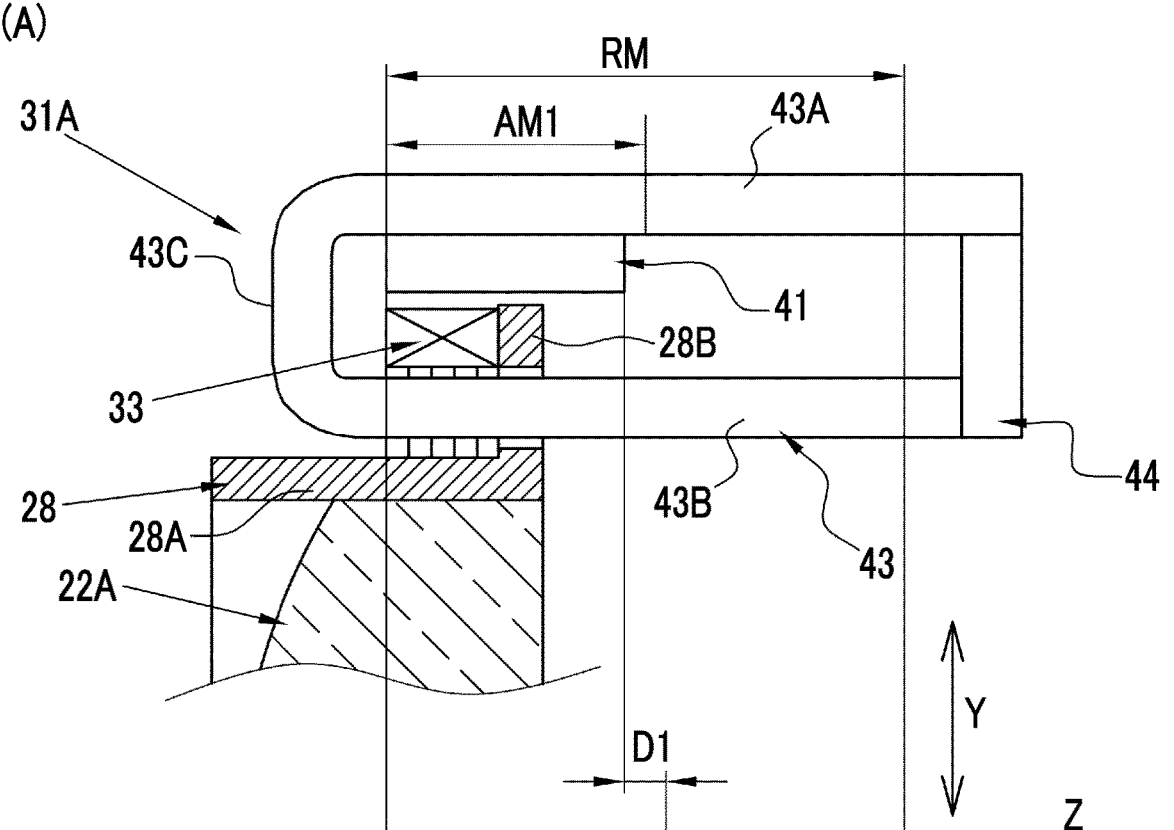
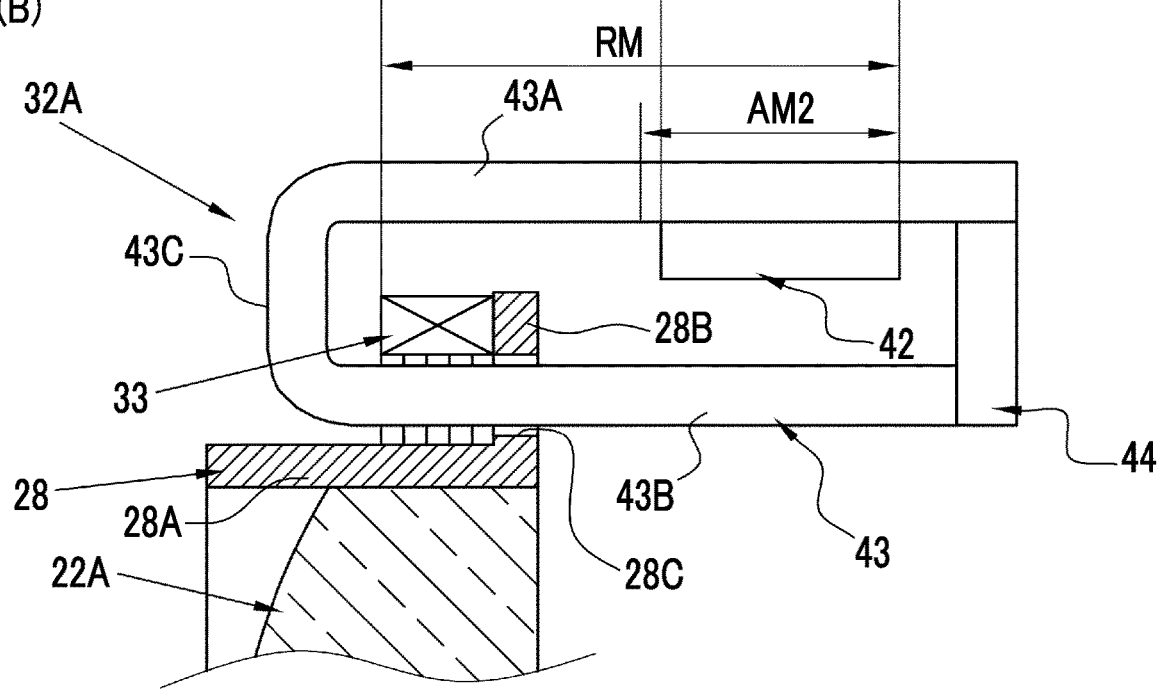

FIG. 23
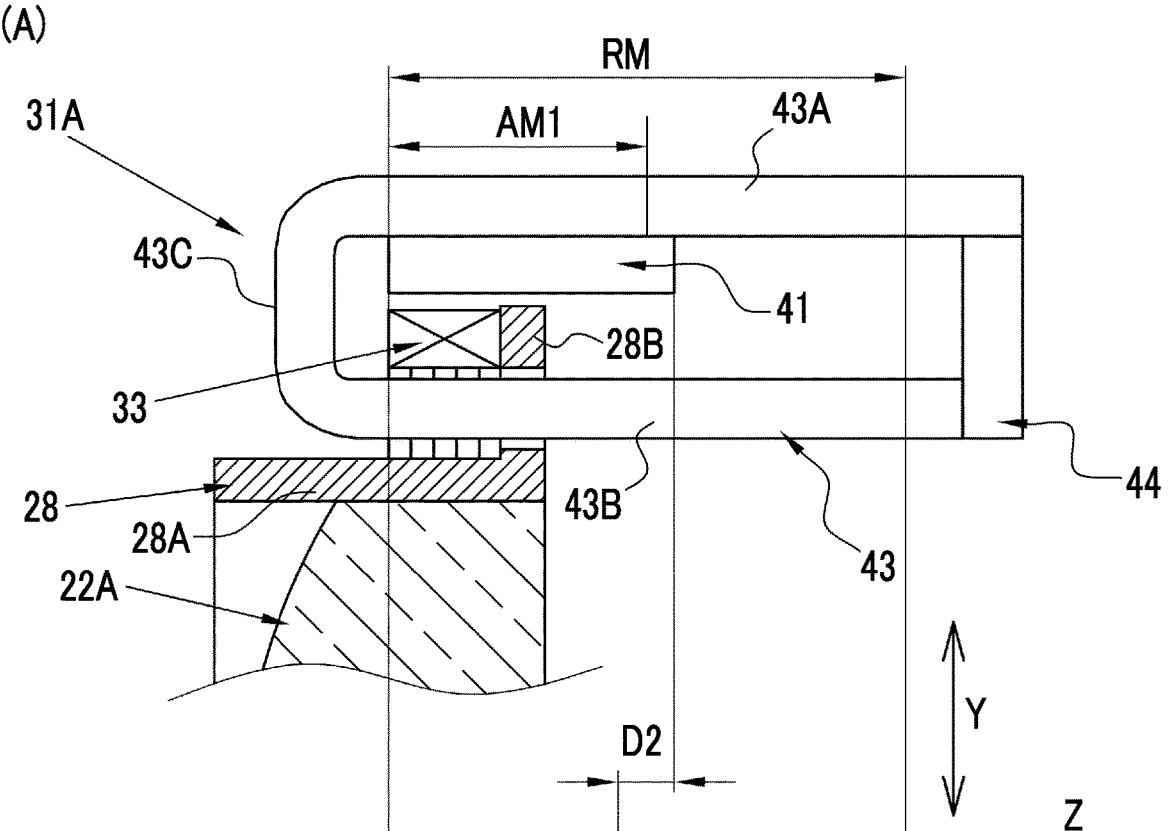
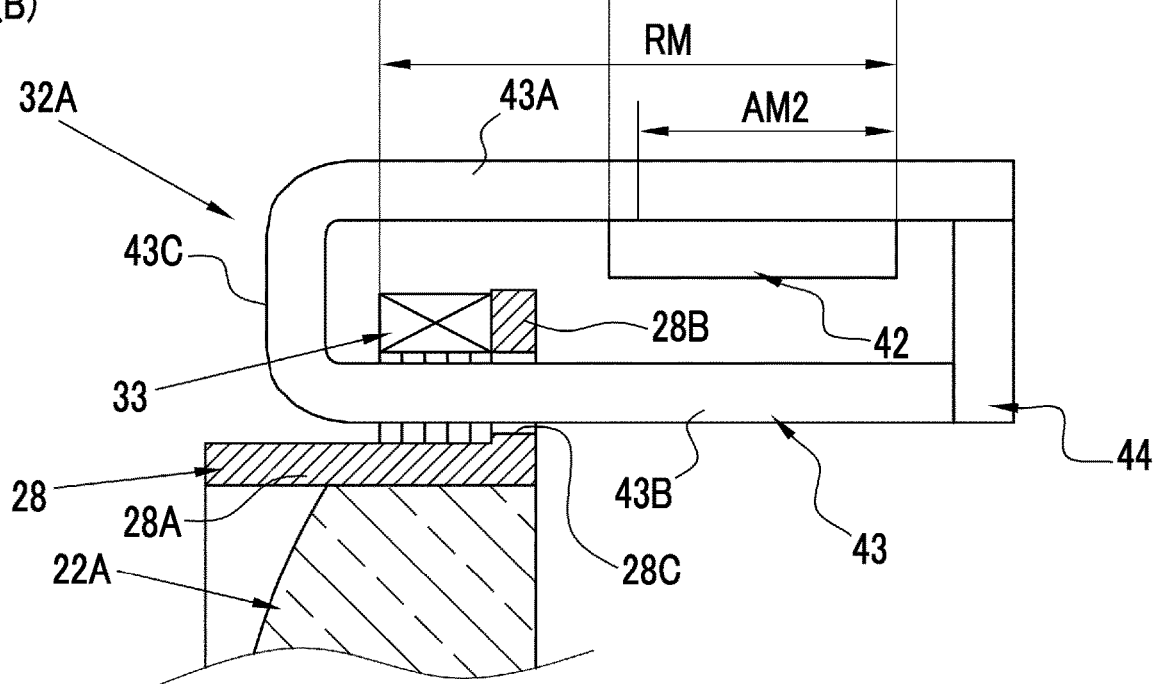

DRIVE DEVICE AND OPTICAL DEVICE

CROSS-REFERENCE TO RELATED APPLICATIONS

This application claims priority under 35 U.S.C § 119(a) to Japanese Patent Application No. 2022-051666 filed on 28 Mar. 2022. The above application is hereby expressly incorporated by reference, in its entirety, into the present application.

BACKGROUND OF THE INVENTION

1. Field of the Invention

The present invention relates to a drive device that drives an optical system and an optical device.

2. Description of the Related Art

JP3765825B discloses a lens drive device comprising a lens for imaging a subject, a lens frame that holds the lens and has a guide hole formed substantially parallel with an optical axis of the lens, a fixing unit that has a guide shaft that is slidably engaged with the guide hole and guides the lens frame in an optical axis direction, a coil fixed to the lens frame, a magnet that is engaged with the coil, and a yoke to which the magnet is attached. In the lens drive device, the yoke is configured to be movable in the optical axis direction of the lens.

JP5866487B (corresponding to US2016/103297A1) discloses a lens unit comprising two lens drive units each including a yoke, a voice coil, and a plate-shape magnet. A center point connecting line connecting the respective center positions of the lens drive units on a vertical plane of a lens optical axis is disposed at a position that does not pass through the lens optical axis. A magnet width in a circumferential direction of a circle of a lens is narrower than a yoke width, and the magnets are disposed, respectively to lean on an end portion side of the yoke in the circumferential direction of the circle of the lens in the division region in which the center of the lens optical axis is present among division regions divided by the center point connecting line. A shortest distance between the lens optical axis and an action point connecting line connecting the respective center positions of the lens drive unit with respect to the magnet is shorter than a shortest distance between the center point connecting line and the lens optical axis.

SUMMARY OF THE INVENTION

One embodiment according to the technology of the present disclosure provides a drive device and an optical device capable of efficiently obtaining a thrust and suppressing an increase in a dimension in a radial direction to reduce a size.

An aspect according to the technology of the present disclosure relates to a drive device that drives an optical system along an optical axis direction of the optical system, the device comprising a base portion, and a first coil, in which the base portion drives the first coil and the optical system by an electromagnetic force generated in the first coil, and the base portion includes a first base portion in which a first magnet corresponding to a first movement amount of movement of the optical system is disposed and a second base portion in which a second magnet corresponding to a second movement amount of movement of the optical system is disposed. The base portion includes a yoke and a magnet disposed on the yoke. The first coil is bonded to the optical system and corresponds to the magnet.

It is preferable that the magnet be installed on an inner surface side formed in a bent shape of the yoke. It is preferable that lengths of the first magnet and the second magnet in the optical axis direction be shorter than a maximum movement amount of movement of the optical system.

It is preferable that the drive device further comprise a position detection sensor that includes a magnetic body and detects a position of the optical system by magnetism of the magnetic body, and a magnetism suppression member that suppresses magnetism of the first magnet and/or the second magnet in a magnetic field of the magnetic body.

It is preferable that the first base portions be disposed in pairs at positions facing each other with an optical axis interposed therebetween, and the second base portions be disposed in pairs at positions facing each other with the optical axis interposed therebetween.

It is preferable that the yoke be composed of a plurality of yoke constituent members, and the plurality of yoke constituent members be bonded to each other at a portion other than an end portion of the yoke in the optical axis direction.

It is preferable that the drive device further comprise a support member that supports the yoke, in which the yoke is formed with a fixing hole for fixing the yoke to the support member at a position other than an end portion of the yoke in the optical axis direction.

It is preferable that the drive device further comprise a support member that supports the yoke, in which the yoke is fixed by adhesion to the support member, press-fitting into the support member, or holding by a holding member that is bonded to the support member.

It is preferable that the first coil have a cylindrical shape, and the yoke and the magnet be formed in an arc shape corresponding to the cylindrical shape.

The first magnet and the second magnet may be disposed to be spaced from each other in the optical axis direction. The first magnet and the second magnet may have a portion having overlapping positions in the optical axis direction.

Another aspect according to the technology of the present disclosure relates to an optical device comprising the drive device described above.

BRIEF DESCRIPTION OF THE DRAWINGS

FIG. 14 is a cross-sectional view of a main part of the drive device in a state in which a focus lens is located at a distal end of a movement range.

FIG. 15 is a cross-sectional view of a main part of the drive device in a state in which the focus lens is moved from the distal end to the center within the movement range.

FIG. 16 is a cross-sectional view of a main part of the drive device in a state in which the focus lens has entered a base end side from the center within the movement range.

FIG. 17 is a cross-sectional view of a main part of the drive device in a state in which the focus lens is located at the base end of the movement range.

FIG. 21 is an explanatory diagram showing a method of positioning a first magnet and a second magnet in a third modification example.

FIG. 22 is a cross-sectional view of a main part showing a disposition of a first magnet and a second magnet in a fourth modification example.

FIG. 23 is a cross-sectional view of a main part showing a disposition of a first magnet and a second magnet in a fifth modification example.

DESCRIPTION OF THE PREFERRED EMBODIMENTS

First Embodiment

Figure 1:
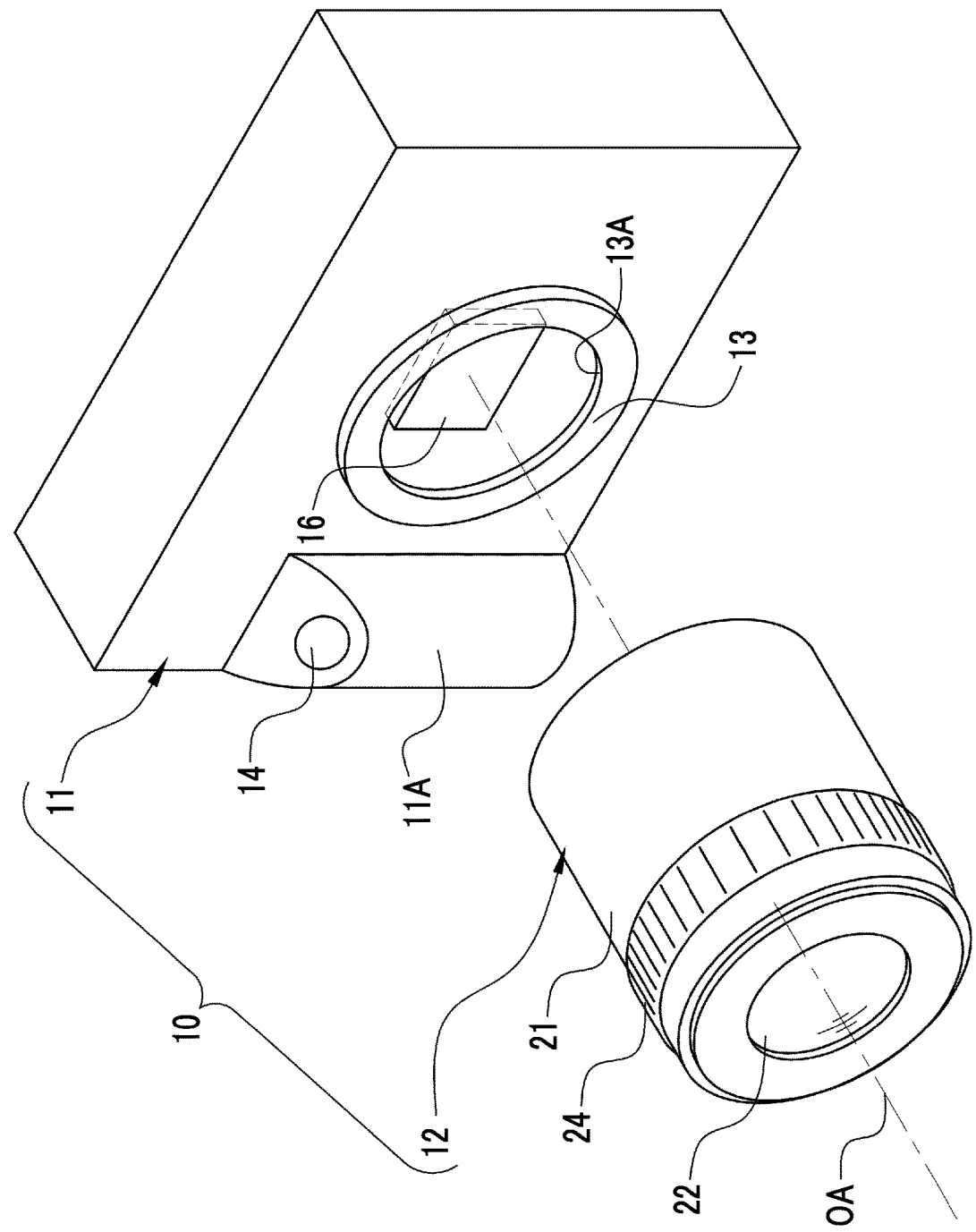
FIG. 1 is an exploded perspective view of a digital camera.

As shown in FIG. 1, a digital camera 10 comprises a camera body 11 and an interchangeable lens barrel 12. A lens mount 13, a release switch 14, a power switch (not shown), and the like are provided on a front surface of the camera body 11. The lens mount 13 has a circular-shaped imaging aperture 13A. The lens barrel 12 is attachably and detachably mounted on the lens mount 13. The lens barrel 12 is an example of an optical device according to the present invention.

An imaging element 16 is built in the camera body 11. The imaging element 16 is a complementary metal oxide semiconductor (CMOS) image sensor, a charge coupled device (CCD) image sensor, or an organic thin-film imaging element. The lens mount 13 is provided with a body-side signal contact 17 (see FIG. 14) inside the imaging aperture 13A for electrically connecting the lens mount 13 to the lens barrel 12 to perform the communication. Moreover, the camera body 11 has a grip portion 11A.

Figure 2:
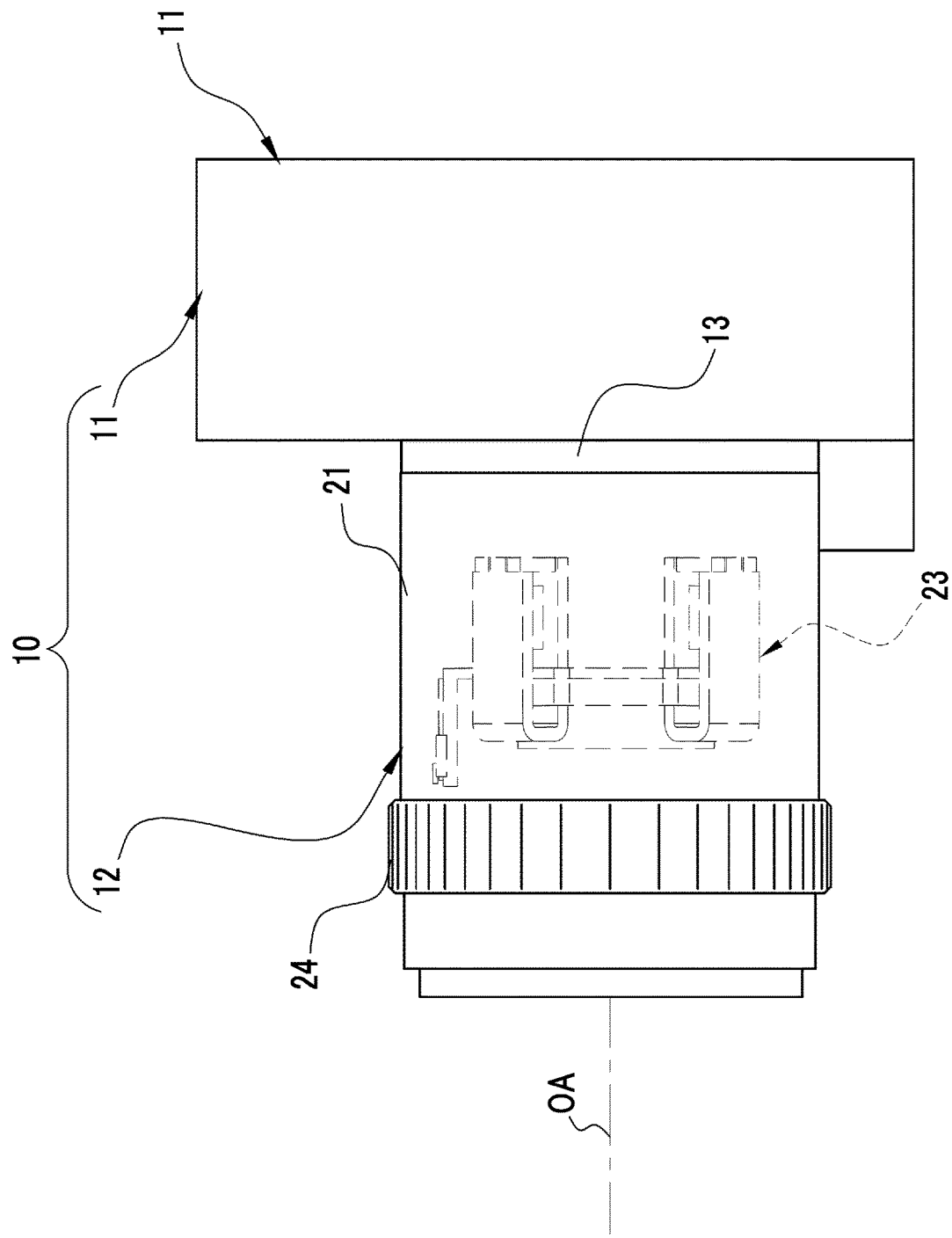
FIG. 2 is a side view of the digital camera.

As shown in FIG. 2, the lens barrel 12 comprises a lens barrel body 21, an imaging optical system 22, a drive device 23, and a focus ring 24. The lens barrel body 21 has a cylindrical shape and holds the imaging optical system 22 and the drive device 23 therein, and is provided with a lens mount 25 (see FIGS. 3 and 14) and a lens-side signal contact 26 (see FIGS. 3 and 14) at a rear end thereof. The imaging optical system 22 images subject light on the imaging element 16 in a case in which the lens barrel 12 is mounted on the camera body 11.

Figure 3:
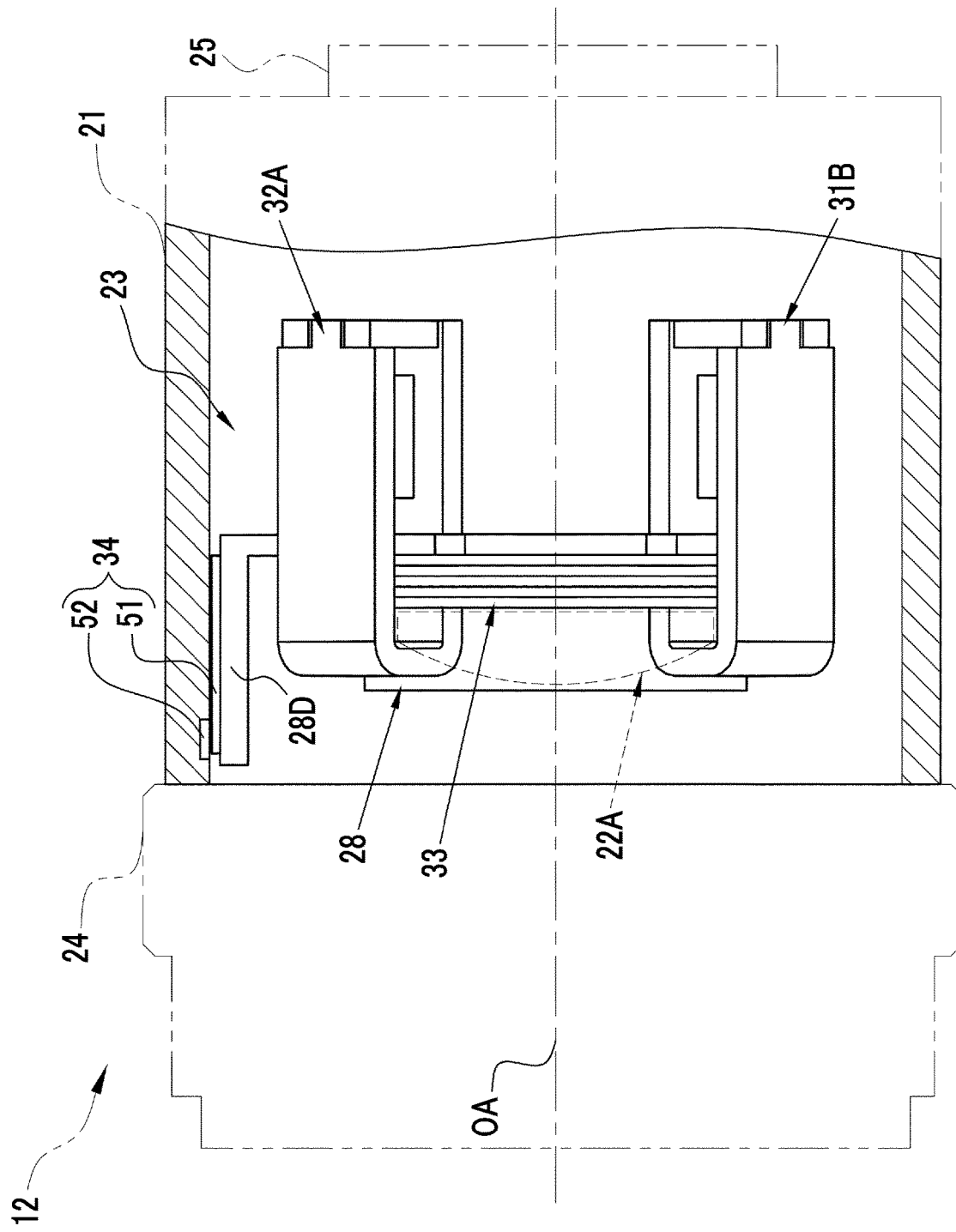
FIG. 3 is a cross-sectional view of a main part of a lens barrel.

As shown in FIG. 3, the drive device 23 is disposed inside the lens barrel 12. The drive device 23 is a voice coil motor (hereinafter, referred to as VCM) and drives a focus lens 22A which is a part of the imaging optical system 22. The focus lens 22A corresponds to an "optical system" within the scope of the claims. The drive device 23 is attached to the lens barrel body 21.

In the lens barrel 12, the focus lens 22A is moved in a Z-axis direction in a case in which the focus is adjusted by control of a camera body controller 71 and an autofocus (AF) processing unit 83 described below. The Z-axis direction is a direction along an optical axis OA of the focus lens 22A. The focus lens 22A is held by a lens holding member 28. The lens holding member 28 is connected to a first coil 33 described below.

Figure 4:
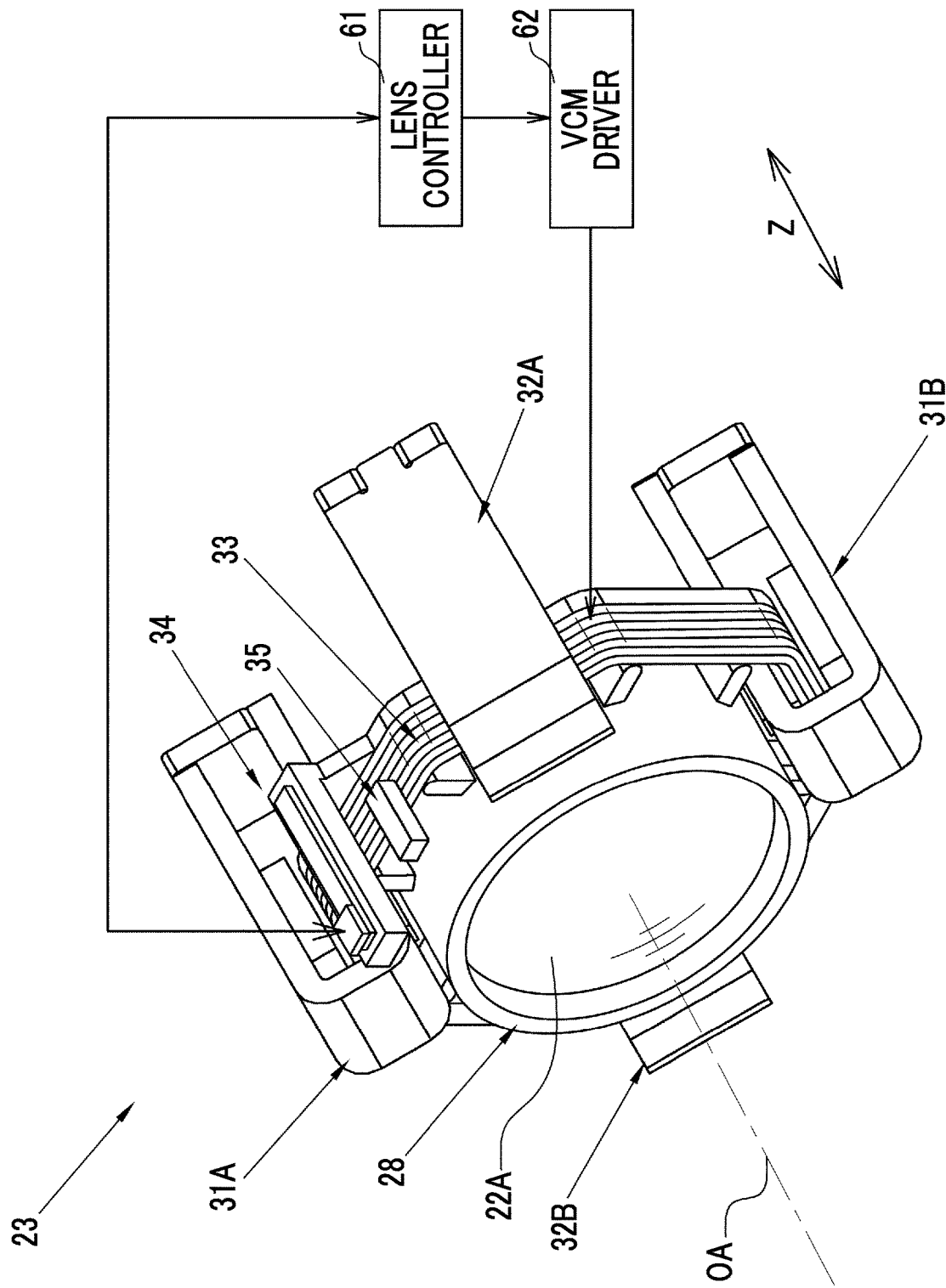
FIG. 4 is a perspective view of a drive device.

As shown in FIG. 4, the drive device 23 comprises magnetic circuit units 31A, 31B, 32A, and 32B, a lens holding member 28, the first coil 33, a position detection sensor 34, a magnetism suppression member 35, a lens controller 61, and a VCM driver 62. The lens controller 61 controls the energization of the first coil 33 via the VCM driver 62. Moreover, as will be described below, the lens controller 61 controls each unit of the lens barrel 12.

It should be noted that the magnetic circuit units 31A and 31B correspond to a base portion and a first base portion within the scope of the claims, and the magnetic circuit units 32A and 32B correspond to a base portion and a second base portion within the scope of the claims.

Figure 5:
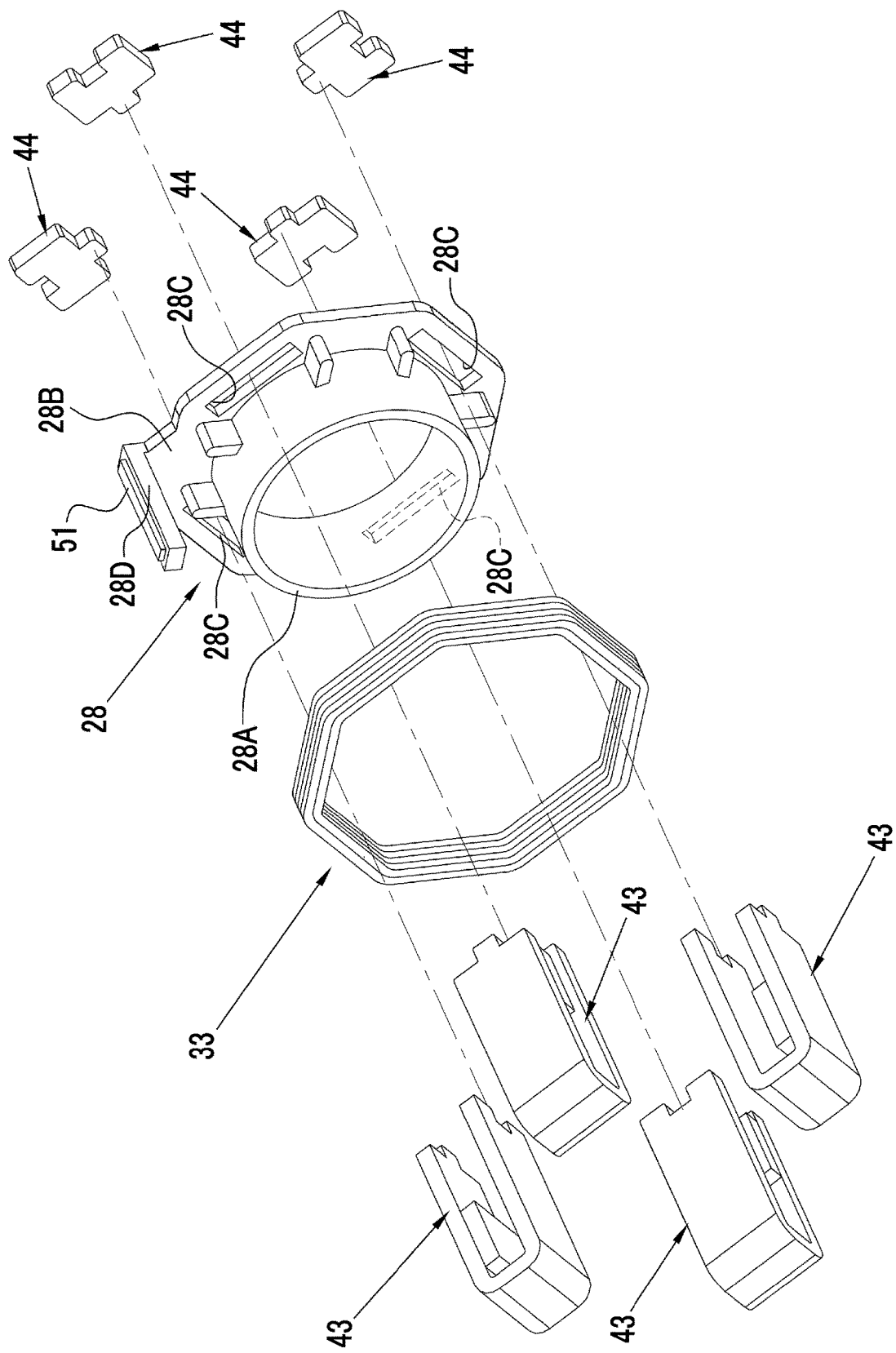
FIG. 5 is an exploded perspective view of the drive device.

As shown in FIG. 5, the first coil 33 is formed by being wound around in an octagonal shape having four sides matching the positions of four magnetic circuit units 31A, 31B, 32A, and 32B described below, and four sides connecting the four sides. The first coil 33 is bonded to the lens holding member 28. That is, the first coil 33 is bonded to the focus lens 22A via the lens holding member 28. The lens holding member 28 has a cylindrical portion 28A and a flange portion 28B.

The cylindrical portion 28A holds the focus lens 22A. The flange portion 28B protrudes from an outer peripheral surface of the cylindrical portion 28A. An outer shape of the flange portion 28B is formed in an octagonal shape corresponding to the first coil 33. The first coil 33 is fixed to the flange portion 28B. As a result, the first coil 33 is disposed around the optical axis OA.

In the flange portion 28B, four through-holes 28C and a sensor holding portion 28D are integrally formed. A first yoke 43 described below is inserted into the through-hole 28C. The through-hole 28C is formed on an inner side than a portion in which the first coil 33 is fixed to the flange portion 28B.

The sensor holding portion 28D is provided at a position outside the first coil 33. The sensor holding portion 28D holds a magnetic body 51 (see FIG. 3) constituting the position detection sensor 34. The position detection sensor 34 will be described below.

Figure 6:
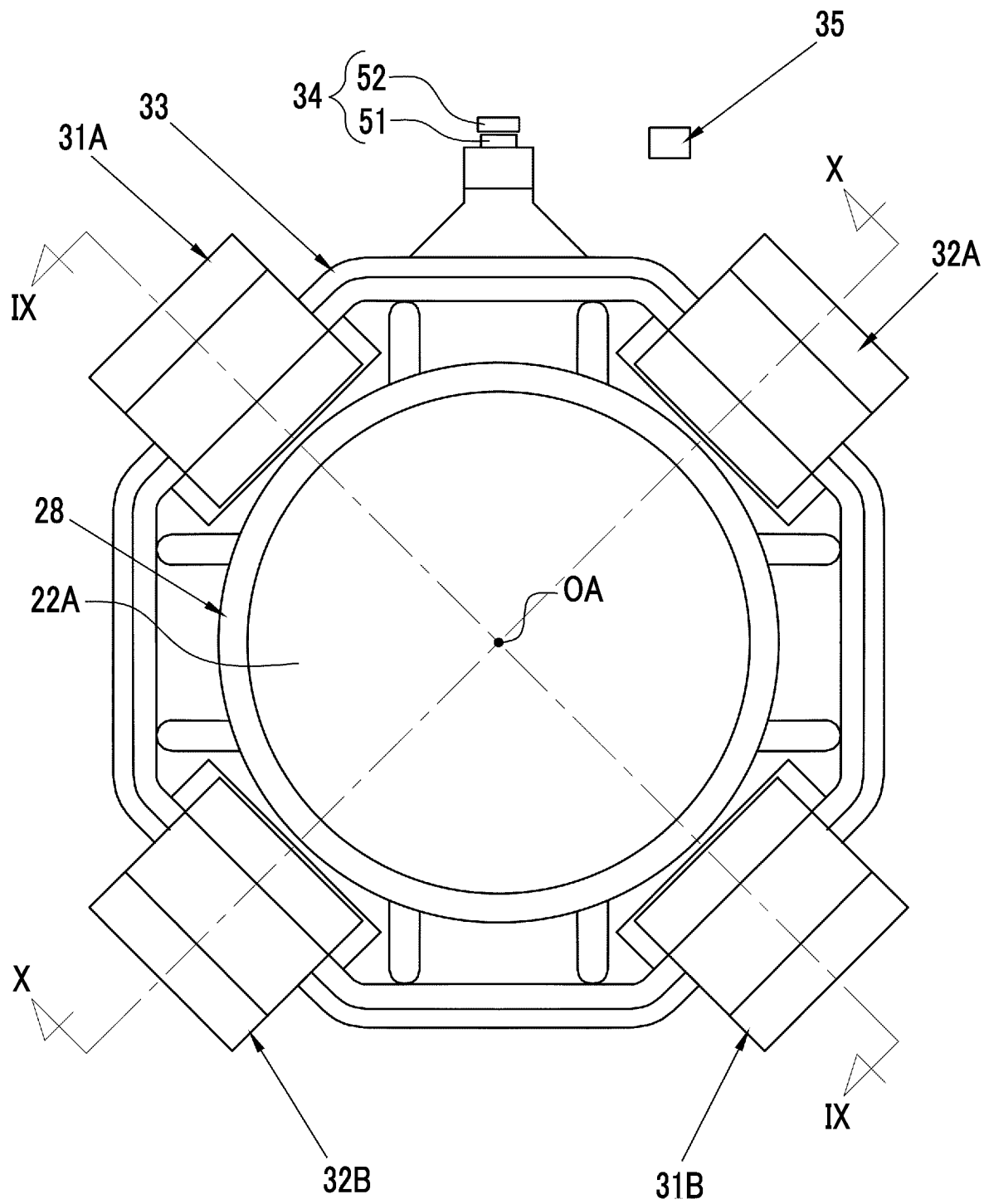
FIG. 6 is a front view of the drive device.

As shown in FIG. 6, the magnetic circuit units 31A, 31B, 32A, and 32B are disposed in pairs at positions facing each other with the optical axis OA interposed therebetween. That is, the magnetic circuit unit 31A and the magnetic circuit unit 31B are disposed in pairs at positions facing each other with the optical axis OA interposed therebetween and the magnetic circuit unit 32A and the magnetic circuit unit 32B are disposed in pairs at positions facing each other with the optical axis OA interposed therebetween.

Figure 7:
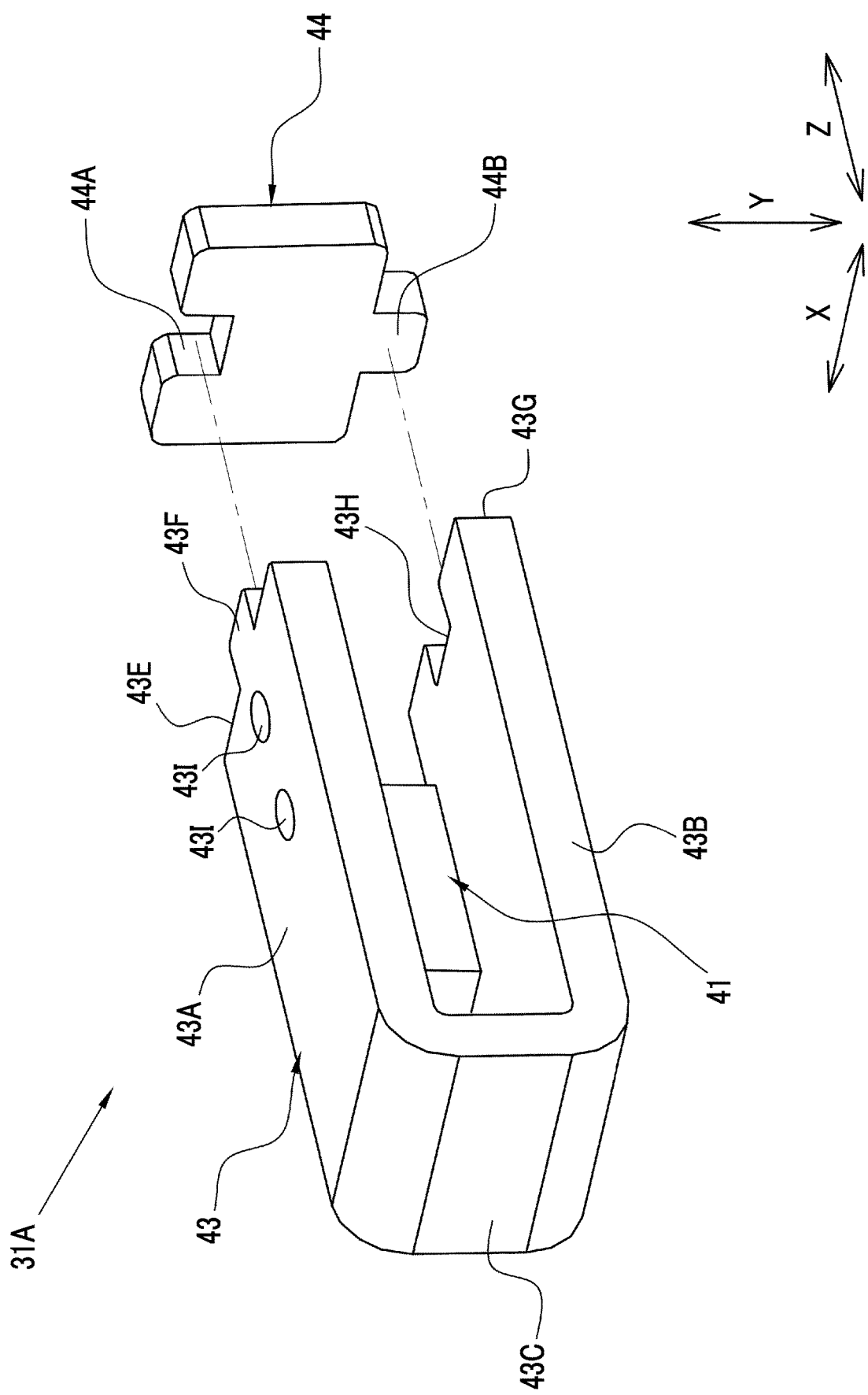
FIG. 7 is an exploded perspective view of a magnetic circuit unit.

As shown in FIG. 7, the magnetic circuit unit 31A comprises a first magnet 41, the first yoke 43, and a second yoke 44. The first yoke 43 and the second yoke 44 are formed of a magnetic material, such as iron. It should be noted that the first yoke 43 and the second yoke 44 correspond to a yoke and a yoke constituent member within the scope of the claims. The first yoke 43 is formed in a bent shape. Specifically, the first yoke 43 is formed in a U-shape. The first yoke 43 is located on the distal end side (subject side) in the Z-axis direction.

Figure 8:
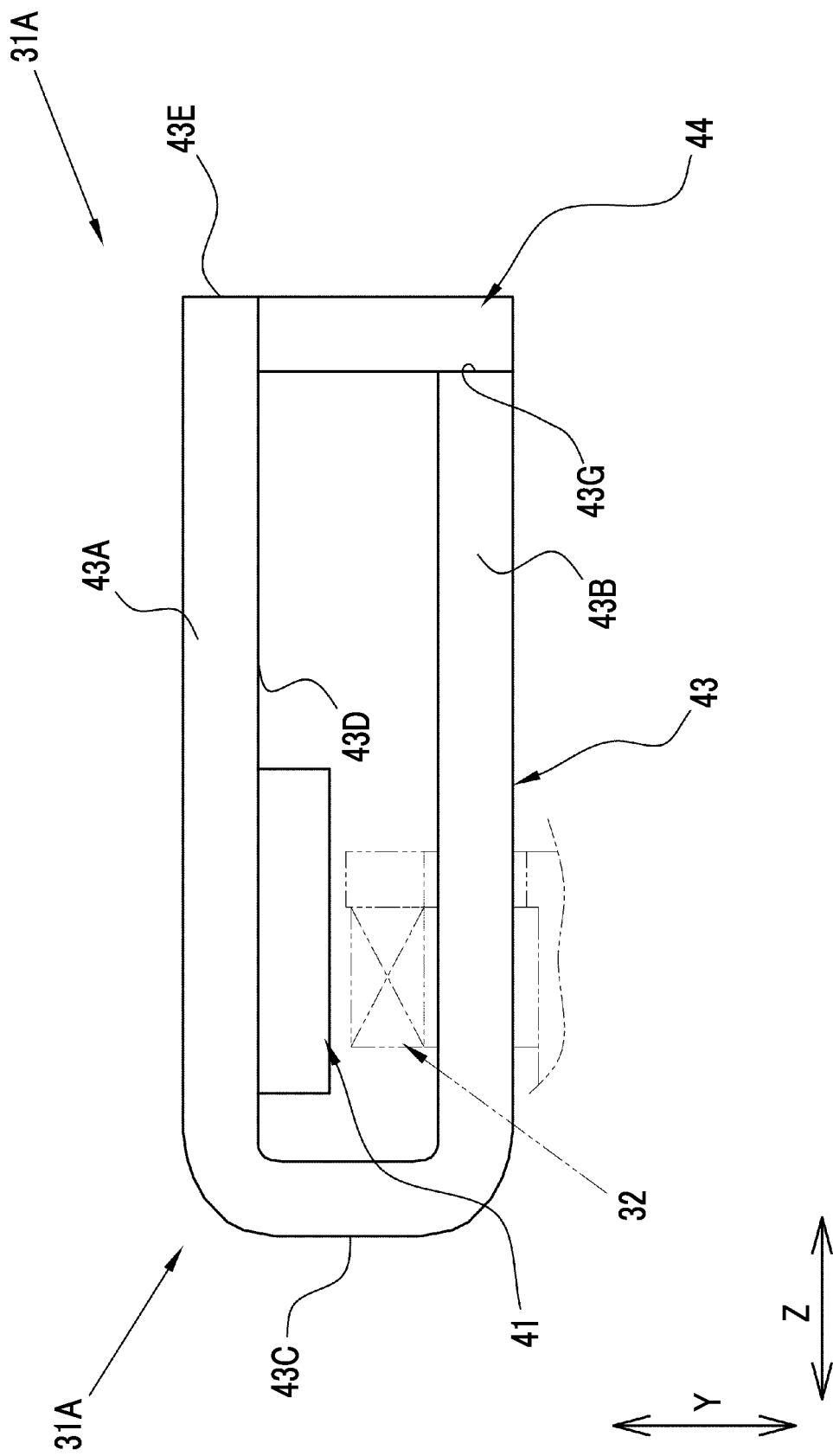
FIG. 8 is a side view of the magnetic circuit unit.

As shown in FIG. 8, the first yoke 43 has an outer flat plate portion 43A, an inner flat plate portion 43B, and a folded-back portion 43C connecting the flat plate portions 43A and 43B. The outer and inner flat plate portions 43A and 43B extend in the Z-axis direction. An inner side surface (surface on the optical axis OA side) of the outer flat plate portion 43A is an installation surface 43D, and the first magnet 41 is fixed to the installation surface 43D. The first magnet 41 is fixed to the installation surface 43D by, for example, adhesion with an adhesive. The installation surface 43D extends in the Z-axis direction. The first yoke 43 is attached to the inside of the lens barrel body 21 by, for example, screwing.

In the first magnet 41, for example, an S pole is magnetized on the outer flat plate portion 43A side of the first yoke 43, and an N pole is magnetized on the inner flat plate portion 43B side on the opposite side. The first magnet 41 is selected from, for example, a ferrite magnet, an alnico magnet, a samarium cobalt magnet, or a neodymium magnet.

In the first yoke 43, the folded-back portion 43C is located on the distal end side, and open ends 43E and 43G are located on the base end side. A protruding portion 43F that protrudes from the end surface to the base end side is formed at the open end 43E of the outer flat plate portion 43A. A recess portion 43H that is recessed from the end surface to the distal end side is formed in the open end 43G of the inner flat plate portion 43B.

The second yoke 44 is located on the base end side (image plane side) in the Z-axis direction with respect to the first yoke 43. The second yoke 44 is disposed along an X-axis direction (tangential direction of the circle about the optical axis OA) and a Y-axis direction (radial direction intersecting the Z-axis direction and the X-axis direction). The second yoke 44 is formed with a recess portion 44A that is recessed from the outer end surface in the Y-axis direction and a protruding portion 44B that protrudes from the inner end surface.

In the second yoke 44, the recess portion 44A is fitted into the protruding portion 43F of the first yoke 43, and the protruding portion 44B is fitted into the recess portion 43H of the first yoke 43. As a result, the first yoke 43 and the second yoke 44 are bonded to each other. It should be noted that, regarding the bonding between the first yoke 43 and the second yoke 44, the first yoke 43 and the second yoke 44 may be bonded to each other by only fitting between the recess portion 44A and the protruding portion 43F and fitting between the protruding portion 44B and the recess portion 43H, or may be bonded by a combination of these fittings and adhesion with an adhesive.

Figure 9:
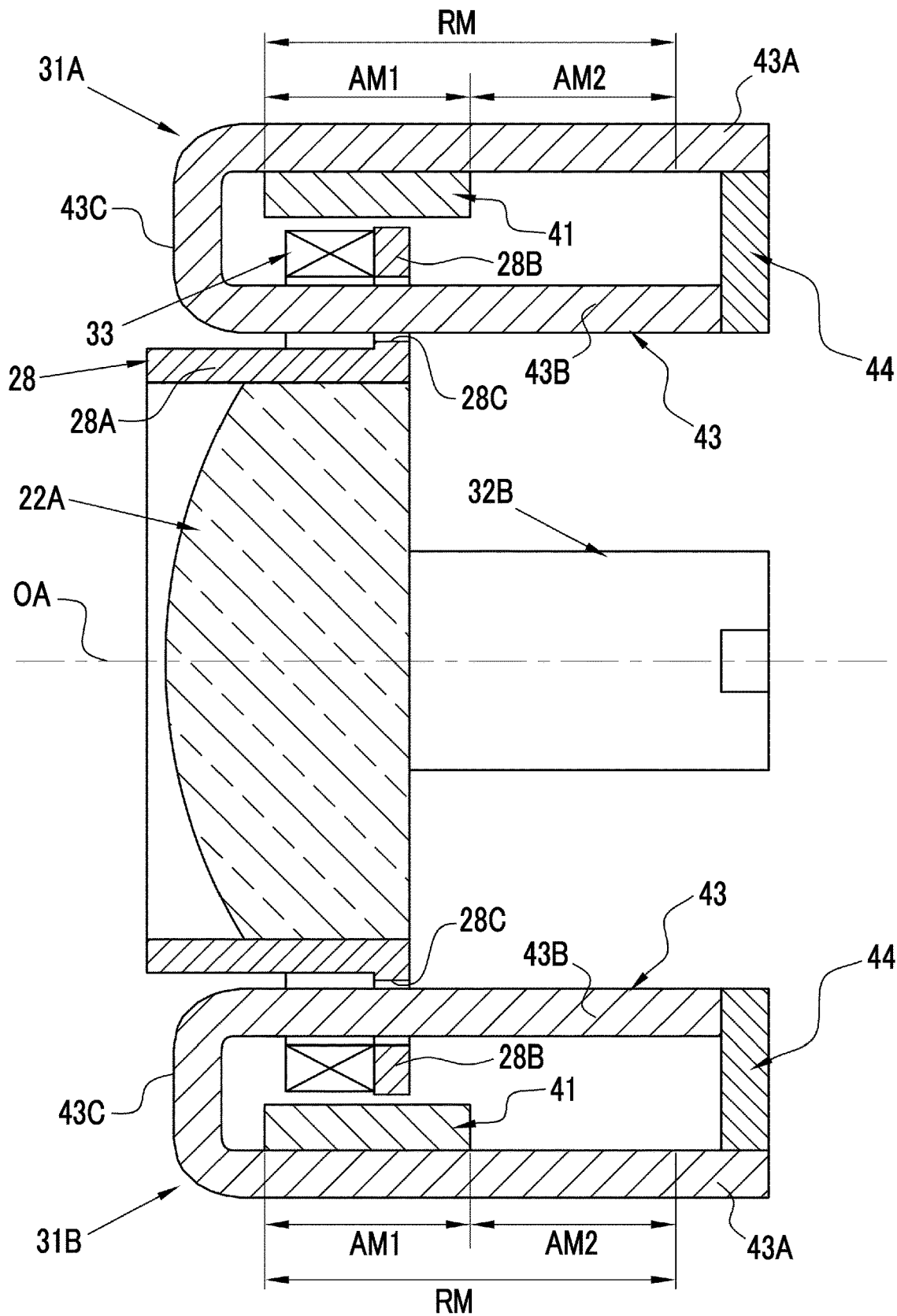
FIG. 9 is a cross-sectional view of a main part of the drive device in a IX-IX line of FIG. 6.

As shown in FIG. 9, the magnetic circuit unit 31B comprises the first magnet 41, the first yoke 43, and the second yoke 44, similarly to the magnetic circuit unit 31A. Further, the magnetic circuit unit 31A and the magnetic circuit unit 31B are disposed at positions facing each other with the optical axis OA interposed therebetween, and the components are also disposed at symmetrical positions with the optical axis OA interposed therebetween.

As described above, in the first yoke 43, the inner flat plate portion 43B is inserted into the through-hole 28C of the lens holding member 28. The lens holding member 28 into which the inner flat plate portion 43B is inserted is moved along the inner flat plate portion 43B.

On the other hand, since the first coil 33 is fixed at a position outside the through-hole 28C, the first coil 33 is located inside the first yoke 43 into which the through-hole 28C is inserted. That is, a part of the first coil 33 is disposed inside the magnetic circuit units 31A and 31B.

In the magnetic circuit units 31A and 31B, the first magnet 41 is disposed at a position corresponding to a first movement amount AM1 in which the focus lens 22A is moved in a movement range RM in which the focus lens 22A is moved. It should be noted that the movement range RM is a maximum movement amount in which the focus lens 22A is moved by the drive device 23. In the present embodiment, the first movement amount AM1 is disposed at a position of half of the movement range RM on the distal end side. That is, the first magnet 41 is disposed at a position corresponding to the movement range RM from the distal end to the center. Therefore, a length of the first magnet 41 in the Z-axis direction is shorter than the movement range RM.

Figure 10:
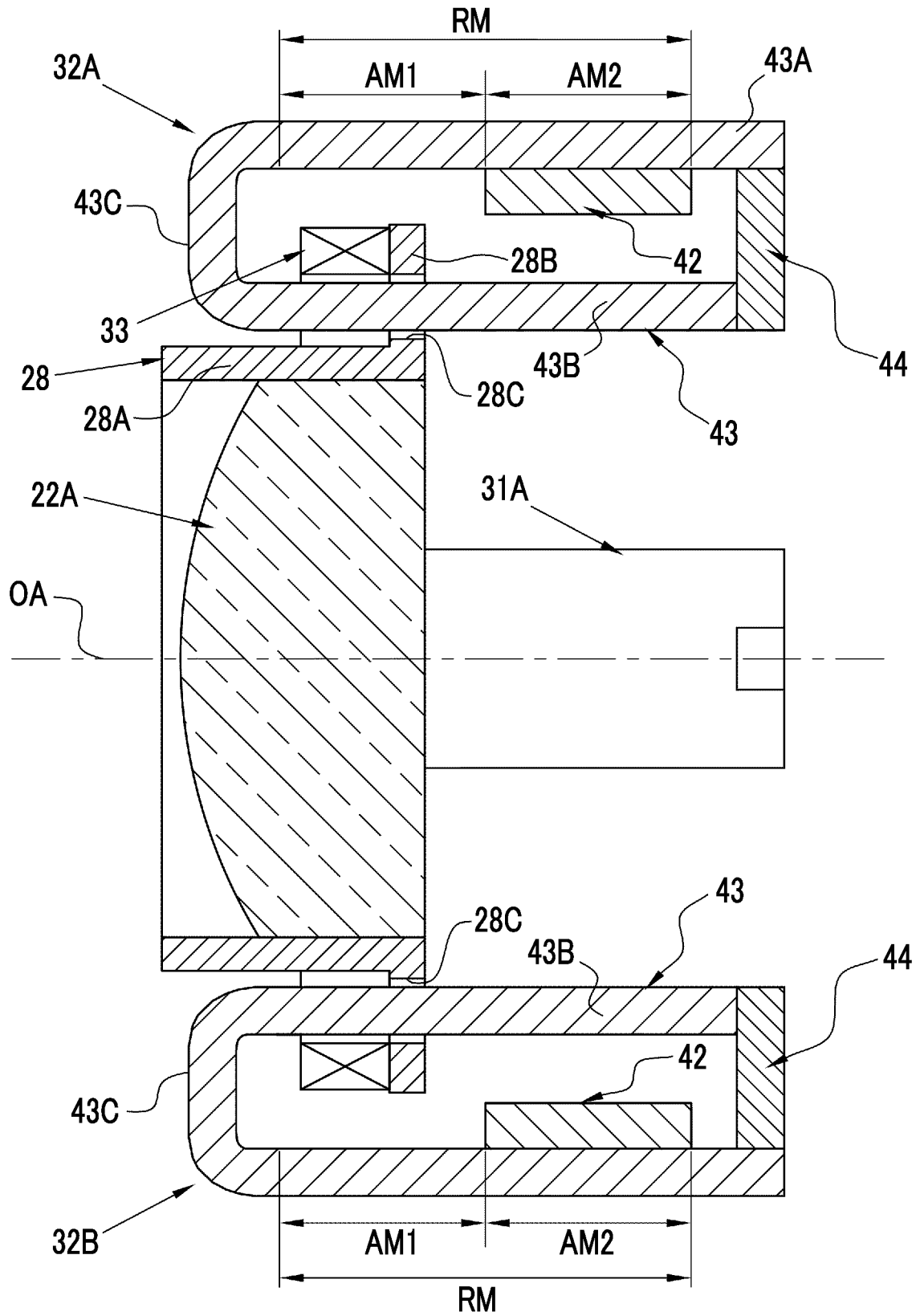
FIG. 10 is a cross-sectional view of a main part of the drive device in a X-X line of FIG. 6.

As shown in FIG. 10, the magnetic circuit units 32A and 32B comprise a second magnet 42, the first yoke 43, and the second yoke 44. That is, the magnetic circuit units 32A and 32B have the same configuration of the first yoke 43 and the second yoke 44 as the magnetic circuit units 31A and 31B, and have a difference in that the second magnet 42 is provided instead of the first magnet 41.

The second magnet 42 has the same material, magnetization direction, thickness dimension, and the like as those of the first magnet 41, and is different from the first magnet 41 in an installation position in the Z-axis direction. Specifically, the second magnet 42 is disposed at a position corresponding to a second movement amount AM2 in which the focus lens 22A is moved in the movement range RM. In the present embodiment, the second movement amount AM2 is disposed at a position of half of the movement range RM on the base end side. That is, the second magnet 42 is disposed at a position corresponding to the movement range RM from the center to the base end. Therefore, a length of the second magnet 42 in the Z-axis direction is shorter than the movement range RM.

Similarly to the magnetic circuit unit 32A, the magnetic circuit unit 32B comprises the second magnet 42, the first yoke 43, and the second yoke 44. Further, the magnetic circuit unit 32A and the magnetic circuit unit 32B are disposed at positions facing each other with the optical axis OA interposed therebetween, and the components are also disposed at symmetrical positions with the optical axis OA interposed therebetween. Similarly to the magnetic circuit units 31A and 31B, a part of the first coil 33 is disposed inside the magnetic circuit units 32A and 32B. That is, the first coil 33 is disposed at a position corresponding to the first magnet 41 and the second magnet 42.

In a case in which the VCM driver 62 energizes the first coil 33 by the control of the lens controller 61 and an electromagnetic force is generated in the first coil 33, the first coil 33 located in magnetic fields of the first magnet 41 and the second magnet 42 is moved in the Z-axis direction along the inner flat plate portion 43B by an electromagnetic force generated in the first coil 33. In a case in which the first coil 33 is energized, the electromagnetic force is generated by the magnetic field and the current (so-called Fleming's left-hand rule). By matching the direction in which the electromagnetic force is generated with the optical axis OA, the first coil 33 is driven in the Z-axis direction using the electromagnetic force as a thrust.

Moreover, a fixing hole 431 (see FIG. 7) for fixing the first yoke 43 to the lens barrel body 21 is formed at a position in the vicinity of the base end portion of the outer flat plate portion 43A, that is, the open end 43E. In the present embodiment, two fixing holes 431 are disposed along the Z-axis direction. Specifically, the fixing hole 431 is a female screw hole.

Figure 11:
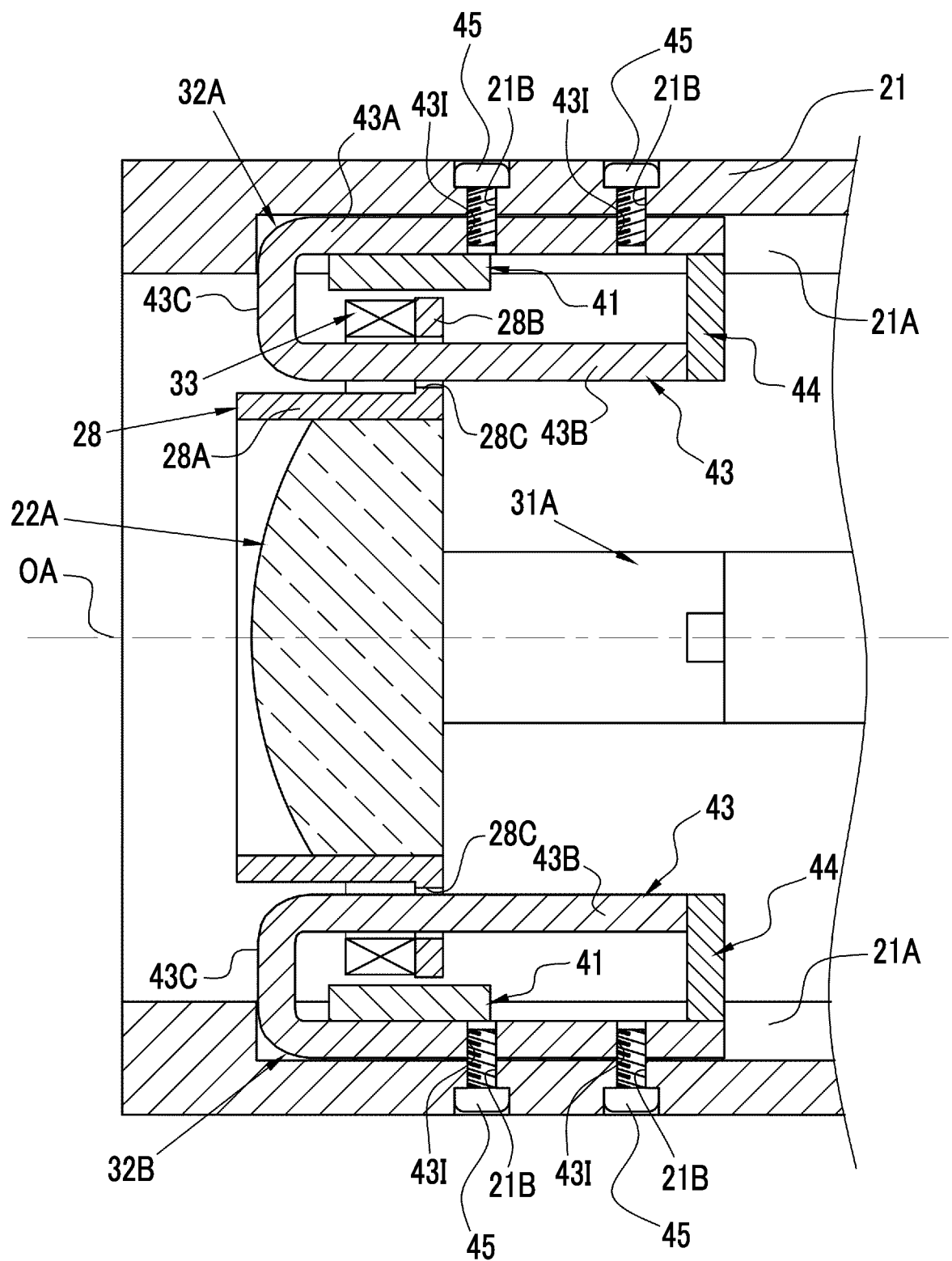
FIG. 11 is a cross-sectional view of a main part around a screw member that fixes a yoke.

As shown in FIG. 11, the magnetic circuit units 31A, 31B, 32A, and 32B are inserted into the inside of the lens barrel body 21 in a state in which the inner flat plate portion 43B is inserted into the through-hole 28C of the lens holding member 28 and is disposed around the focus lens 22A and the first coil 33. The magnetic circuit units 31A, 31B, 32A, and 32B are fitted into a groove 21A formed on an inner peripheral surface of the lens barrel body 21. A fixing hole 21B is formed in the groove 21A. The first yoke 43 is fixed to the lens barrel body 21 by screwing a screw member 45 into the fixing hole 21B and the fixing hole 431. That is, the magnetic circuit units 31A, 31B, 32A, and 32B including the first yoke 43 are fixed to the lens barrel body 21.

The position detection sensor 34 is located between the magnetic circuit unit 31A and the magnetic circuit unit 32A (see FIG. 6). The position detection sensor 34 detects a position of the lens holding member 28, that is, the focus lens 22A. The position detection sensor 34 is composed of the magnetic body 51 and a magnetic sensor 52. For example, a multi-pole magnetizing magnet is used as the magnetic body 51, and a magnetoresistive sensor (MR sensor) is used as the magnetic sensor 52.

The magnetic body 51 is attached to the sensor holding portion 28D of the lens holding member 28 (see FIGS. 5 and 6). The magnetic sensor 52 is attached to the lens barrel body 21 to face the magnetic body 51 (see FIG. 6). The magnetic body 51 is magnetized in a pattern in which N poles and S poles are alternately arranged along the Z-axis direction. A pattern width of the magnetization is, for example, about 100 µm. The magnetic sensor 52 is configured by using, for example, various magnetic resistance (MR) elements of which an electric resistance value is changed in accordance with strength of the magnetic field.

The magnetic sensor 52 outputs a pulse signal corresponding to the pattern of the magnetic body 51 in which the N poles and the S poles are alternately arranged or an electric signal that is changed periodically to the lens controller 61. Based on this output, the lens controller 61 can detect the position of the lens holding member 28, that is, the focus lens 22A. It should be noted that the position detection sensor 34 is not limited to this, and may include, for example, a hall sensor formed of a hall element and a magnet.

Figure 12:
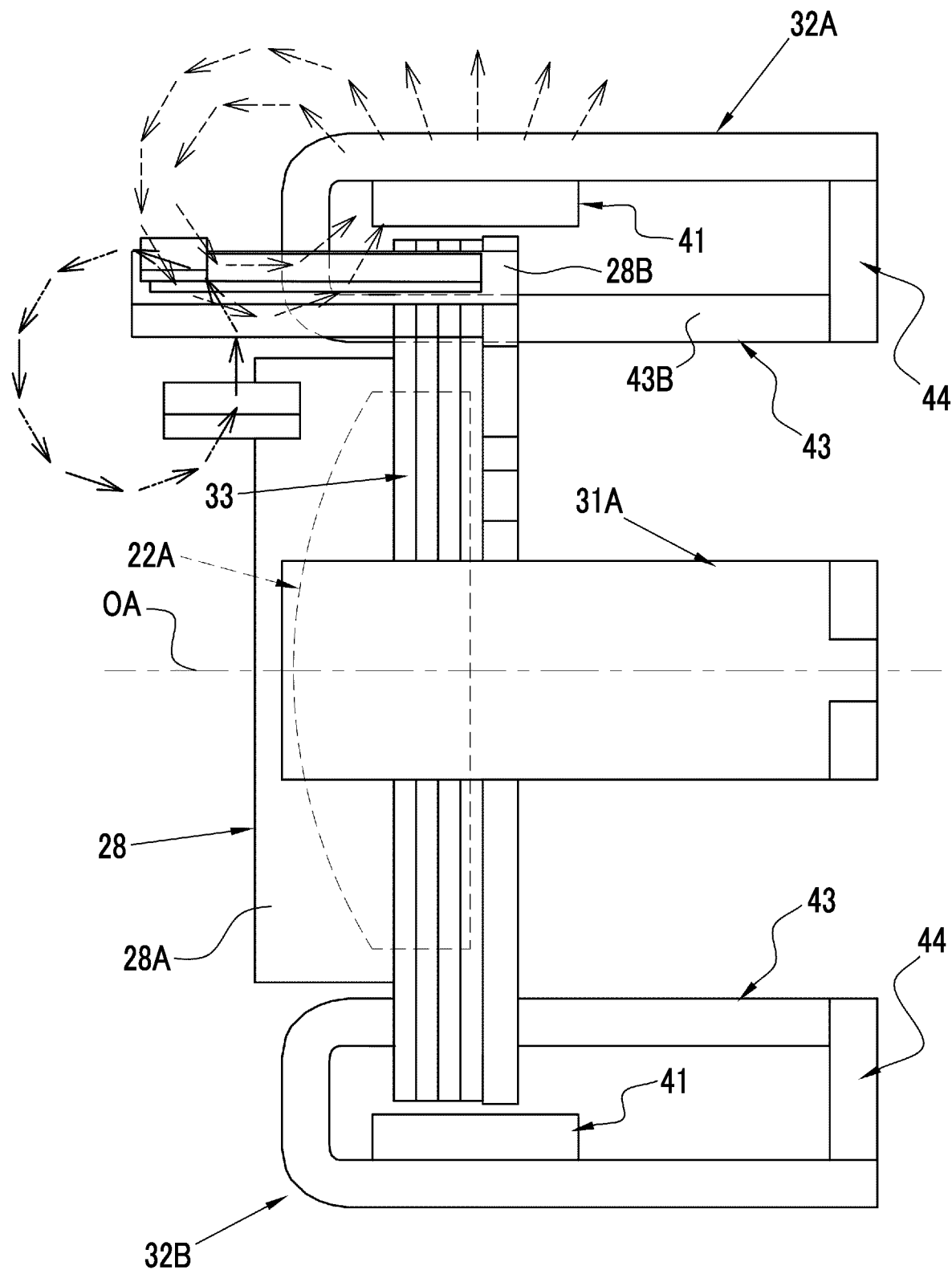
FIG. 12 is an explanatory diagram showing an influence of a magnetic field of a first magnet and a magnetism suppression member.

As shown in FIG. 12, since the position detection sensor 34 is located between the magnetic circuit unit 31A and the magnetic circuit unit 32A, the position detection sensor 34 is influenced by the magnetic fields of the first magnet 41 and the second magnet 42. In the present embodiment, the magnetic sensor 52 constituting the position detection sensor 34 is located on the distal end side with respect to the magnetic circuit units 31A and 32A. As a result, the magnetic sensor 52 is susceptible to the influence of a magnetic flux (indicated by the broken arrow in FIG. 12) of the first magnet 41 located closer to the distal end side than the second magnet 42.

As described above, the magnetic sensor 52 is located in the magnetic field of the magnetic body 51. However, since the influence of the magnetic field of the first magnet 41 is large, there is a probability that the accuracy of the position detection of the focus lens 22A is decreased due to the influence of noise by the first magnet 41. Therefore, in the present embodiment, the magnetism suppression member 35 is provided to prevent the influence of noise by the first magnet 41. That is, the magnetism suppression member 35 is disposed in a direction in which the magnetic flux by the magnetism suppression member 35 (indicated by a double-dot chain arrow in FIG. 12) cancels the magnetic field by the first magnet 41. As a result, since the magnetism suppression member 35 suppresses magnetism of the first magnet 41 in the magnetic field of the magnetic body 51, it is possible to prevent the influence of noise by the first magnet 41. As a result, the position detection sensor 34 can detect the position of the focus lens 22A with high accuracy. It should be noted that the magnetism suppression member 35 is attached to the lens barrel body 21, similarly to the magnetic sensor 52.

It should be noted that, in the present embodiment, the magnetism suppression member 35 that suppresses the magnetism of the first magnet 41 in the magnetic field of the magnetic body 51 is disposed in consideration of the influence of noise caused by the first magnet, but the present invention is not limited to this, and the magnetism suppression member 35 may be disposed in consideration of the influence of noise by the second magnet 42. In this case, the magnetism suppression member 35 is disposed in a direction of canceling the magnetic field by the second magnet 42. Alternatively, a magnetism suppression member that suppresses the magnetism of the first magnet 41 in the magnetic field of the magnetic body 51 and a magnetism suppression member that suppresses magnetism of the second magnet 42 may be provided, respectively.

Figure 13:
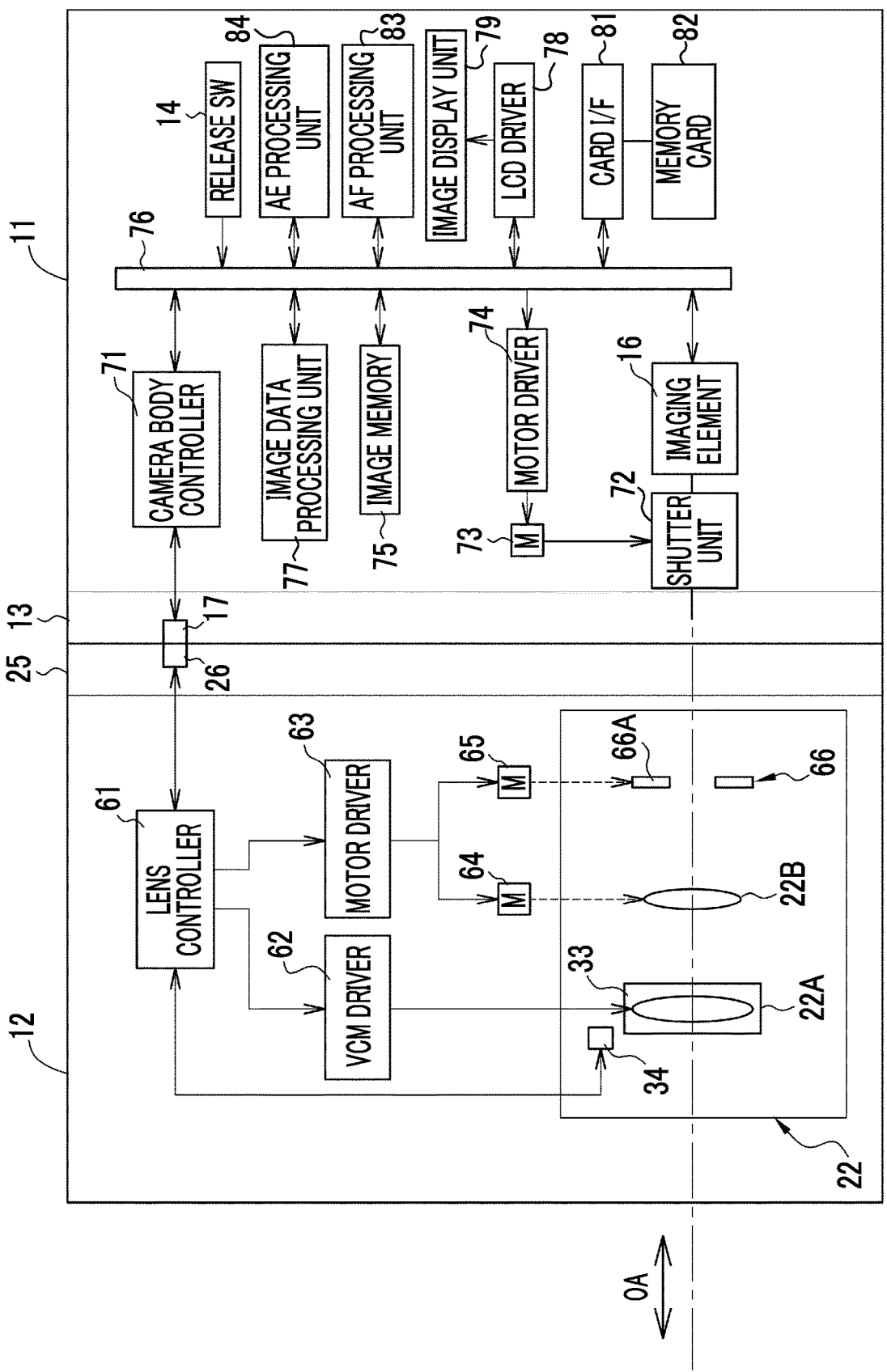
FIG. 13 is a block diagram showing a schematic configuration of the digital camera.

As shown in FIG. 13, the lens barrel 12 comprises a motor driver 63 and motors 64 and 65, in addition to the imaging optical system 22, the first coil 33, the position detection sensor 34, the lens controller 61, and the VCM driver 62.

The lens controller 61 consists of a microcomputer comprising a central processing unit (CPU), a read only memory (ROM) that stores programs or parameters used in the CPU, a random access memory (RAM) used as a work memory of the CPU (none of which is shown), and controls each unit of the lens barrel 12. The VCM driver 62, the motor driver 63, and the position detection sensor 34 are connected to the lens controller 61.

The lens controller 61 controls driving of a stop unit 66, the focus lens 22A, a zoom lens 22B, and the like based on the control signal from a camera body controller 71 described below.

The imaging optical system 22 comprises a plurality of lenses including the focus lens 22A and the zoom lens 22B, the stop unit 66, and the like. The focus lens 22A is moved in the optical axis OA direction by energizing the first coil 33, and adjusts a focal length. The lens controller 61 transmits a control signal for moving the focus lens 22A to the VCM driver 62 in response to the control signal on the camera body 11 side. The VCM driver 62 energizes the first coil 33 based on the control signal to drive the first coil 33. It should be noted that the lens controller 61 may detect the rotational position of the focus ring 24 with a sensor (not shown) and move the focus lens 22A in accordance with information on the rotation direction and the rotation amount.

The zoom lens 22B is moved in the optical axis OA direction due to the driving of the motor 64 and constitutes an electric zoom mechanism that magnifies an angle of view of the imaging optical system 22. In the zoom mechanism, for example, a movement amount and a movement direction of the zoom lens 22B are decided in response to the operation on the camera body 11 side. The angle of view of the imaging optical system 22 can be magnified by moving the zoom lens 22B.

The stop unit 66 moves a plurality of stop leaf blades 66A by driving of the motor 65 to change an amount of light incident on the imaging element 16. The motor driver 63 controls the driving of the motors 64 and 65 based on the control of the lens controller 61.

The camera body controller 71 comprises a CPU, a ROM that stores programs or parameters used in the CPU, and a RAM used as a work memory of the CPU (none of which is shown). The camera body controller 71 controls the camera body 11 and each unit of the lens barrel 12 connected to the camera body 11. A release signal is input to the camera body controller 71 from the release switch 14. Moreover, the body-side signal contact 17 is connected to the camera body controller 71.

The lens-side signal contact 26 comes into contact with the body-side signal contact 17 in a case in which the lens mount 25 of the lens barrel 12 is mounted on the lens mount 13 of the camera body 11, and the lens barrel 12 and the camera body 11 are electrically connected to each other.

A shutter unit 72 is a so-called focal plane shutter, and is disposed between the lens mount 13 and the imaging element 16. The shutter unit 72 is provided to be able to block an optical path between the imaging optical system 22 and the imaging element 16, and is changed between an opened state and a closed state. The shutter unit 72 is put into the opened state in a case of capturing a live view image and a video. In a case of capturing a still image, the shutter unit 72 is temporarily put into the closed state from the opened state. The shutter unit 72 is driven by a shutter motor 73. A motor driver 74 controls the driving of the shutter motor 73.

The imaging element 16 is driven and controlled by the camera body controller 71. The imaging element 16 has a light-receiving surface configured by a plurality of pixels (not shown) arranged in a two-dimensional matrix. Each pixel includes a photoelectric conversion element, and performs photoelectric conversion of a subject image imaged on the light-receiving surface by the imaging optical system 22 to generate an imaging signal.

Moreover, the imaging element 16 comprises a signal processing circuit (none of which is shown), such as a noise removal circuit, an auto gain controller, and an A/D conversion circuit. The noise removal circuit performs noise removal processing on the imaging signal. The auto gain controller amplifies a level of the imaging signal to an optimum value. The A/D conversion circuit converts the imaging signal into a digital signal and outputs the converted signal from the imaging element 16 to a busline 76. The output signal of the imaging element 16 is image data (so-called RAW data) having one color signal for each pixel.

An image memory 75 stores image data for one frame output to the busline 76. An image data processing unit 77 reads out the image data for one frame from the image memory 75 and performs known image processing, such as matrix operation, demosaicing processing, y correction, brightness/color difference conversion, and resizing processing.

An LCD driver 78 sequentially inputs the image data for one frame subjected to the image processing by the image data processing unit 77 to an image display unit 79. The image display unit 79 is provided, for example, on a rear surface of the camera body 11 and sequentially displays the live view images at regular intervals. A card interface (I/F) 81 is incorporated in a card slot (not shown) provided in the camera body 11 and is electrically connected to a memory card 82 inserted in the card slot. The card I/F 81 stores the image data subjected to the image processing by the image data processing unit 77 in the memory card 82. Moreover, in a case in which the image data stored in the memory card 82 is reproduced and displayed, the card I/F 81 reads out the image data from the memory card 82.

The camera body controller 71 transmits a control signal for driving the focus lens 22A, to the lens controller 61 in accordance with a phase difference detected by the AF processing unit 83 described below. Based on the control signal, the lens controller 61 controls the VCM driver 62 to move the focus lens 22A, and detects the position of the focus lens 22A by the position detection sensor 34. Then, the lens controller 61 moves the focus lens 22A to a position at which the phase difference detected by the AF processing unit 83 is the minimum value.

The camera body controller 71 operates the stop unit 66 in accordance with exposure information calculated by an automatic exposure (AE) processing unit 84 described below, and transmits a control signal for changing a stop diameter to the lens controller 61. The lens controller 61 controls the motor driver 74 based on the control signal, and controls the stop diameter of the stop unit 66 to obtain a stop value calculated by the AE processing unit 84.

The AE processing unit 84 calculates an integrated value of each color signal from the image data for one frame. The camera body controller 71 calculates an appropriate exposure value based on the integrated value calculated for each image for one frame, and decides the stop value to be an appropriate exposure value calculated with respect to a preset shutter speed. The camera body controller 71 transmits the control signal to the lens controller 61. The lens controller 61 controls the motor driver 63 based on the control signal, and operates the stop unit 66 at the stop diameter at which the decided stop value is obtained.

The AF processing unit 83 detects the phase difference by a pupil division method from the image data for one frame. It should be noted that, since the technology of the focus adjustment by the phase difference detection is well known, the detailed description thereof will be omitted. The camera body controller 71 detects the position (focus position) of the focus lens 22A at which the phase difference is the minimum value based on the phase difference calculated each time the image for one frame is obtained from the AF processing unit 83 and the position of the focus lens 22A detected by the position detection sensor 34. The camera body controller 71 moves the focus lens 22A to the detected focus position, and stops the movement of the focus lens 22A. In this way, the focus adjustment is automatically performed without any operation by a user.

It should be noted that the AF processing performed by the camera body controller 71 and the AF processing unit 83 is not limited to the focus adjustment by the phase difference detection, and may be contrast type focus adjustment. In this case, the AF processing unit 83 calculates an AF evaluation value, which is an integrated value of high-frequency components, from the image data for one frame. The camera body controller 71 detects the position (focus position) of the focus lens 22A at which the AF evaluation value is the maximum value based on the AF evaluation value calculated each time the image for one frame is obtained from the AF processing unit 83 and the position of the focus lens 22A detected by the position detection sensor 34. The following is the same as in the case of the phase difference detection, the camera body controller 71 moves the focus lens 22A to the detected focus position, and stops the movement of the focus lens 22A.

The operation of the lens barrel 12 according to the present embodiment will be described. In a case in which the lens barrel 12 is attached to the camera body 11 and the power switch (not shown) is operated by a user who is an imager, the power is supplied to each unit of the digital camera 10.

In a state in which the power of the digital camera 10 is turned on, the imaging element 16, the camera body controller 71, the lens controller 61, and the like are activated. As described above, in a case in which the control signal from the camera body controller 71 is received or in accordance with the information on the rotation direction and the rotation amount of the focus ring 24, the lens controller 61 moves the focus lens 22A.

The operation of moving the focus lens 22A in the Z-axis direction by energizing the first coil 33 will be described with reference to FIGS. 14 to 17. The focus lens 22A is located at the most distal end position of the movement range RM in FIG. 14, and is located at the most base end position of the movement range RM in FIG. 17. It should be noted that FIGS. 14 to 17 show a cross section (A) passing through the magnetic circuit unit 31A and a cross section (B) passing through the magnetic circuit unit 32A. However, in order to prevent complication, the lens barrel body 21 and the like will be omitted.

In a case in which the focus lens 22A is moved from the most distal end position in the movement range RM shown in the portions (A) and (B) of FIG. 14 to the position of the most base end shown in the portions (A) and (B) of FIG. 17, the VCM driver 62 energizes the first coil 33 by the control of the lens controller 61 and generates the electromagnetic force in the first coil 33. As a result, as shown in the portions (A) and (B) of FIG. 15, the lens holding member 28 and the focus lens 22A are moved to the base end side in the Z-axis direction together with the first coil 33 located in the magnetic field of the first magnet 41. As described above, since the first magnet 41 is disposed at the position corresponding to the first movement amount AM1 in the movement range RM, the first coil 33, the lens holding member 28, and the focus lens 22A can be driven from the distal end to the center position in the movement range RM.

In a case in which the energization of the first coil 33 is further continued by the control of the lens controller 61, as shown in the portions (A) and (B) of FIG. 16, the first coil 33 enters from the center to the base end side position in the movement range RM. As a result, the lens holding member 28 and the focus lens 22A are further moved to the base end side in the Z-axis direction together with the first coil 33 located in the magnetic field of the second magnet 42. Since the second magnet 42 is disposed at the position corresponding to the second movement amount AM2 in the movement range RM, as shown in the portions (A) and (B) of FIG. 17, the first coil 33 can be driven from the center to the base end position in the movement range RM.

As described above, since the electromagnetic force is generated in the first coil 33 energized in the magnetic field of the first magnet 41 at the position corresponding to the first movement amount in the movement range RM and in the magnetic field of the second magnet 42 at the position corresponding to the second movement amount in the movement range RM, the first coil 33 can be driven from the distal end to the base end in the movement range RM. As a result, the lens holding member 28 and the focus lens 22A, which are provided integrally with the first coil 33, can be moved in the movement range RM.

On the other hand, in a case in which the focus lens 22A is moved from the position of the most base end shown in FIG. 17 toward the most distal end position shown in FIG. 14, the direction of the current flowing through the first coil 33 need only be reversed from the case described above. As a result, the lens holding member 28 and the focus lens 22A, which are provided integrally with the first coil 33, are moved to the distal end side of the movement range RM. Then, since the electromagnetic force is generated in the first coil 33 energized in the magnetic field of the second magnet 42 at the position corresponding to the second movement amount in the movement range RM and in the magnetic field of the first magnet 41 at the position corresponding to the first movement amount in the movement range RM, the first coil 33 can be driven from the distal end to the base end in the movement range RM.

As described above, since the drive device 23 comprises the magnetic circuit units 31A and 31B in which the first magnet 41 corresponding to the first movement amount AM1 of movement of the focus lens 22A is disposed and the magnetic circuit units 32A and 32B in which the second magnet 42 corresponding to the second movement amount AM2 is disposed, and drives the first coil 33 and the focus lens 22A in the movement range RM by the electromagnetic force generated in the first coil 33, the thrust can be efficiently obtained, and the drive device 23, by extension, the lens barrel 12 can be reduced in weight and size. In regards to this, in the drive device in the related art, the length dimension of the magnet (dimension in the optical axis direction) is decided in accordance with the movement range of the optical system, and the thickness dimension (dimension in the radial direction of the circle about the optical axis) is decided by a space inside the lens barrel. As a result, in order to obtain the thrust for moving the optical system, such as the focus lens, there is no choice but to improve the thrust by mainly increasing the width dimension of the magnet (dimension in the tangential direction of the circle about the optical axis) or increasing the thickness of the yoke, as a result, the drive device is large and heavy. Further, in a case in which the length dimension of the magnet is lengthened in accordance with the movement range RM, the magnetic force of the magnet itself is attenuated by the self-demagnetization action, and it is not possible to efficiently increase the thrust with respect to the increase in the width dimension.

On the other hand, in the drive device 23, the first magnet 41 is disposed at the position corresponding to the first movement amount AM1 and the second magnet 42 is disposed at the position corresponding to the second movement amount AM2 in the movement range RM, so that the length dimensions of the first magnet 41 and the second magnet 42 can be made shorter than the movement range RM. Therefore, in the first magnet 41 and the second magnet 42, the attenuation of the magnetic force due to the self-demagnetization action is reduced, and it is possible to efficiently increase the thrust with respect to the increase in the width dimension. Alternatively, a sufficient thrust can be obtained without increasing the width dimension. As a result, it is not necessary to increase the width dimension of the magnet and the thickness dimension of the yoke. That is, it is possible to reduce the size of the drive device 23, by extension, the lens barrel 12 by suppressing the increase in the dimensions of the lens barrel 12 in the radial direction.

First Modification Example

Figure 18:
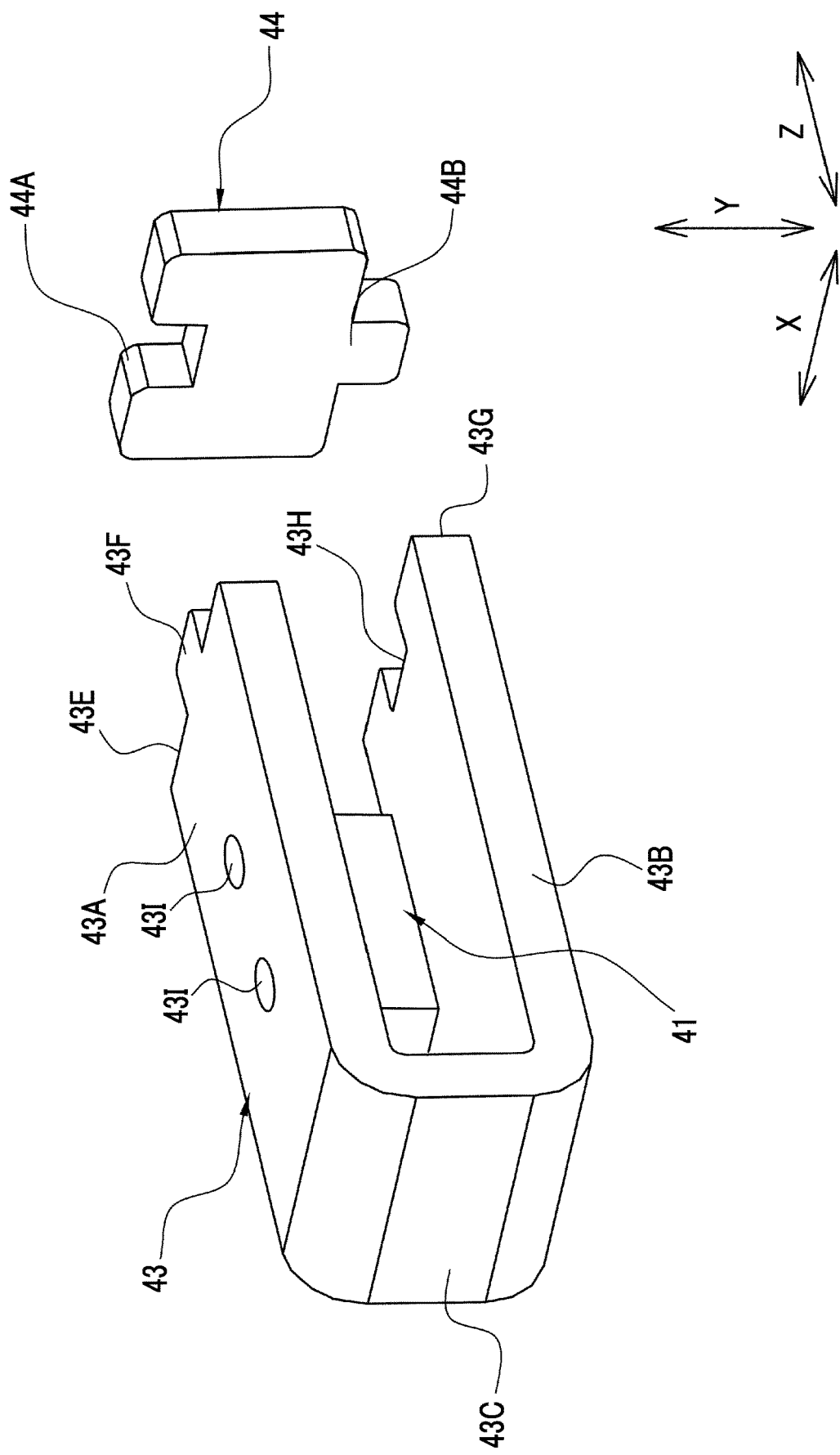
FIG. 18 is an exploded perspective view of a magnetic circuit unit according to a first modification example.

In the embodiment described above, the fixing hole 431 for fixing the first yoke 43 to the lens barrel body 21 is formed at the position of the base end portion of the first yoke 43, but the present invention is not limited to this, as shown in FIG. 18, the fixing hole 431 may be formed at a position other than the end portion of the first yoke 43 in the Z-axis direction (optical axis direction). Specifically, the fixing hole 431 is disposed in the vicinity of the center of the first yoke 43 in the Z-axis direction. It is known that in the yoke disposed along the Z-axis direction, the density of the magnetic flux (indicated by the broken line in FIGS. 14 to 17) is high at the end portion. However, in the magnetic circuit units 31A, 31B, 32A, and 32B in the first embodiment, since the fixing hole 431 is provided at a position of the end portion in the Z-axis direction, the magnetic flux may leak from the fixing hole 431. That is, the magnetic flux of the first magnet 41 or the second magnet 42 cannot be used as the thrust of the first coil 33 without waste.

On the other hand, in the present modification example, since the fixing hole 431 is provided at a portion other than the end portion in the Z-axis direction, the magnetic flux density is low at the position of the fixing hole 431. That is, in addition to the same effects as those of the first embodiment, since the magnetic flux leaking from the fixing hole 431 can be suppressed, the magnetic flux of the first magnet 41 or the second magnet 42 can be used as the thrust of the first coil 33 without waste. As a result, the drive device and the lens barrel 12 can be further reduced in weight and size.

Second Embodiment

In the first embodiment, the first yoke and the second yoke constituting the magnetic circuit units 31A, 31B, 32A, and 32B are bonded to each other at the end portion in the optical axis direction, but the present invention is not limited to this, as shown in FIG. 1, a configuration may be adopted in which the first yoke and the second yoke are bonded to each other at a portion other than the end portion of the yoke in the optical axis direction. In this case, a magnetic circuit unit 90 comprises the first magnet 41, a first yoke 91, and a second yoke 92. The first yoke 91 and the second yoke 92 are formed of a magnetic material, such as iron. It should be noted that the first yoke 91 and the second yoke 92 correspond to a yoke and a yoke constituent member within the scope of the claims. Moreover, in the present embodiment, among the drive device 23 and the magnetic circuit units 31A, 31B, 32A, and 32B in the first embodiment, only the first yoke 43 and the second yoke 44 are replaced with the first yoke 91 and the second yoke 92, other configurations are the same, and thus the same reference numerals are designated, and the description thereof will be omitted.

The first yoke 91 is formed in a bent shape. Specifically, the first yoke 91 is formed in a U-shape. The first yoke 91 is located on the distal end side (subject side) in the Z-axis direction. The first yoke 91 has an outer flat plate portion 91A, an inner flat plate portion 91B, and a folded-back portion 91C connecting the flat plate portions 91A and 91B. The outer and inner flat plate portions 91A and 91B extend in the Z-axis direction. An inner side surface of the outer flat plate portion 91A is an installation surface 91D, and the first magnet 41 is fixed to the installation surface 91D.

In the first yoke 91, the folded-back portion 91C is located on the distal end side, and open ends 91E and 91G are located on the base end side. A protruding portion 91F that protrudes from the end surface to the base end side is formed at the open end 91E of the outer flat plate portion 91A. A recess portion 91H that is recessed from the end surface to the distal end side is formed in the open end 91G of the inner flat plate portion 91B. The open ends 91E and 91G, the protruding portion 91F, and the recess portion 91H are division portions.

On the other hand, the second yoke 92 is located on the base end side (image plane side) in the Z-axis direction with respect to the first yoke 91. The second yoke 92 has an outer flat plate portion 92A, an inner flat plate portion 92B, and a folded-back portion 92C connecting the flat plate portions 92A and 92B. The outer and inner flat plate portions 92A and 92B extend in the Z-axis direction. An inner side surface of the outer flat plate portion 92A is an installation surface 92D. The installation surface 92D extends in the Z-axis direction.

In the second yoke 92, the folded-back portion 92C is located on the base end side, and the open ends 92E and 92G are located on the distal end side. A recess portion 92F that is recessed from the end surface to the base end side is formed in the open end 92E. A protruding portion 92H that protrudes from the end surface to the distal end side is formed at the open end 92G of the inner flat plate portion 92B. The open ends 92E and 92G, the recess portion 92F, and the protruding portion 92H are division portions.

The first yoke 91 and the second yoke 92 are bonded to each other by fitting between the protruding portion 91F and the recess portion 92F and fitting between the recess portion 91H and the protruding portion 92H. It should be noted that, regarding the bonding between the first yoke 91 and the second yoke 92, the first yoke 91 and the second yoke 92 may be bonded to each other by only fitting between the protruding portion 91F and the recess portion 92F and fitting between the recess portion 91H and the protruding portion 92H, or may be bonded by a combination of these fittings and adhesion with an adhesive.

In the magnetic circuit unit 90, the open ends 91E and 91G the protruding portion 91F, the recess portion 91H, the open ends 92E and 92G, the recess portion 92F, and the protruding portion 92H, which are division portions, are located in the vicinity of the center in the Z-axis direction, that is, a portion other than the end portion. As described above, in the yoke disposed along the Z-axis direction, the magnetic flux density is high at the end portion. However, in the magnetic circuit units 31A, 31B, 32A, and 32B of the first embodiment, since the first yoke 43 and the second yoke 44 are bonded to each other at the end portion in the Z-axis direction, the magnetic flux may leak from the bonding portion. That is, the magnetic flux of the first magnet 41 or the second magnet 42 cannot be used as the thrust of the first coil 33 without waste.

On the other hand, in the present embodiment, since the first yoke 91 and the second yoke 92 are bonded to each other at a portion other than the end portion in the Z-axis direction, the magnetic flux density at the bonding portion is low. That is, in addition to the same effects as those of the first embodiment, since the magnetic flux leaking from the bonding portion can be suppressed, the magnetic flux of the first magnet 41 or the second magnet 42 can be used as the thrust of the first coil 33 without waste. Therefore, the drive device and the lens barrel 12 can be further reduced in weight and size.

In the present embodiment, the configurations of the first modification example may be further combined. That is, the fixing holes 911 and 921 for fixing the first yoke 43 to the lens barrel body 21 may be formed at the position other than the end portion in the Z-axis direction (optical axis direction). Specifically, it is preferable to provide the fixing holes 911 and 921 in the vicinity of the division portion. As a result, the effects of the first modification example can also be obtained.

Figure 19:
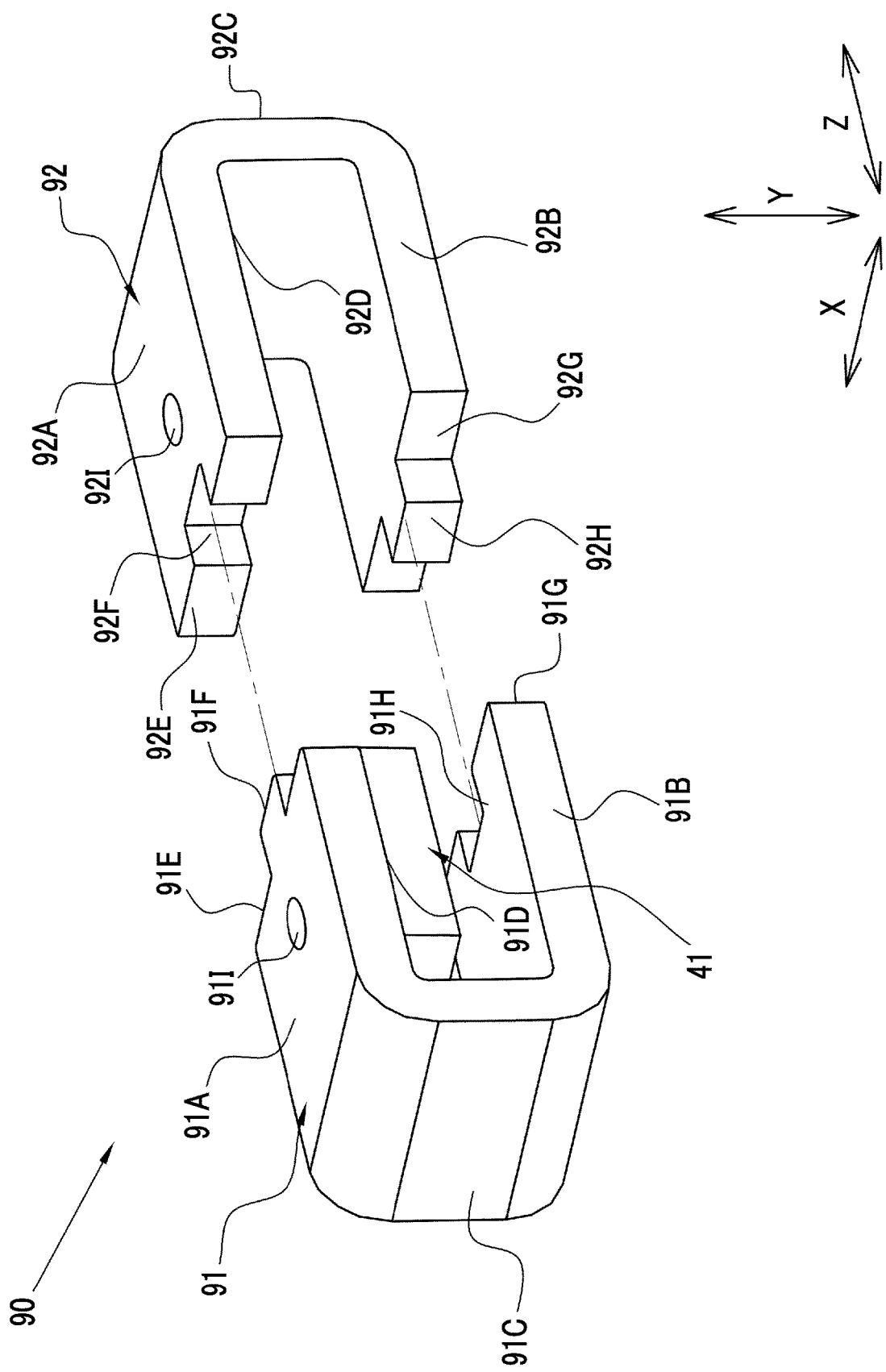
FIG. 19 is an exploded perspective view of a magnetic circuit unit according to a second embodiment.

It should be noted that, in FIG. 19, the magnetic circuit unit 90 (first base portion) comprising the first magnet 41 is shown, but the same configuration may be applied to the magnetic circuit unit (second base portion) comprising the second magnet 42. In this case, it is preferable that the second magnet 42 be fixed to the installation surface 92D of the second yoke 92.

Second Modification Example

Figure 20:
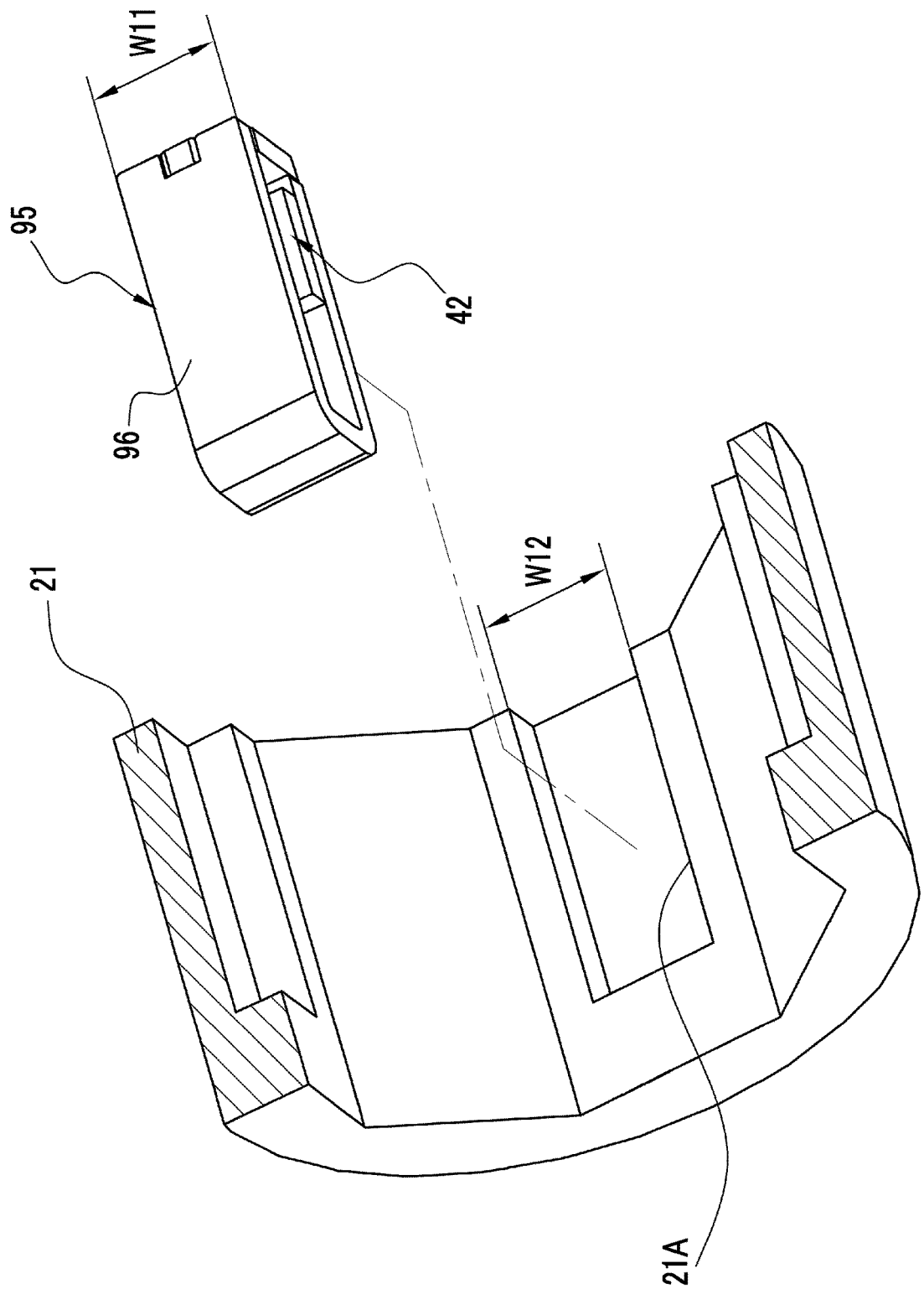
FIG. 20 is a perspective view showing a method of fixing a magnetic circuit to a lens barrel body in a second modification example.

In each of the embodiments described above and the modification example, the yoke is fixed to the lens barrel body 21 by screwing, but the fixing method to the lens barrel body is not limited to this, as in the modification example shown in FIG. 20, a magnetic circuit unit 95 including a first yoke 96 may be fixed by press-fitting. It should be noted that the present modification example has the same configurations as the magnetic circuit units 31A, 31B, 32A, 32B, and 90 in each of the embodiments described above except that a width dimension W11 of the magnetic circuit unit 95 including the first yoke 96 is formed to be slightly wider than a width dimension W12 of the groove 21A formed in the inner peripheral surface of the lens barrel body 21. The lens barrel body 21 is formed of an elastically deformable material, such as a resin.

A pressure is applied to the groove 21A of the lens barrel body 21 to insert the magnetic circuit unit 95. The groove 21A receives the pressure from the magnetic circuit unit 95 and expands due to elastic deformation. As a result, the magnetic circuit unit 95 can be inserted into the groove 21A. Moreover, the groove 21A tries to return to the original width dimension W12 due to the elastic deformation. As a result, the magnetic circuit unit 95 can be fixed to the lens barrel body 21.

Moreover, the method of fixing the yoke and the magnetic circuit unit to the lens barrel body 21 is not limited to the above, and fixing with, for example, an adhesive may be adopted. Alternatively, a holding member to be bonded to the lens barrel body may be separately provided, and the yoke and the magnetic circuit unit may be fixed by the holding member.

Third Modification Example

In each of the embodiments described above and the modification examples, the first magnet 41 is disposed at the position corresponding to the first movement amount AM1 in the movement range RM, and the second magnet 42 is disposed at the position corresponding to the second movement amount AM2 in the movement range RM. In a case in which the first magnet 41 and the second magnet 42 are disposed at such positions, as in the modification example shown in FIG. 21, it is preferable to perform positioning of the first magnet 41 and the second magnet 42 in the Z-axis direction by using jigs 98A and 98B. The jigs 98A and 98B may be removed after fixing the first magnet 41 and the second magnet 42 to the yoke. Alternatively, the jigs 98A and 98B may be formed of a non-magnetic body, such as a resin material, and the first magnet 41 and the second magnet 42 may be fixed to the yoke and then left in the fixed state.

Fourth Modification Example

In each of the embodiments described above and the modification examples, the first magnet 41 has the length dimension corresponding to the first movement amount AM1 in the movement range RM, and the second magnet 42 has the length dimension corresponding to the second movement amount AM2 in the movement range RM. That is, there is no gap between the first magnet 41 and the second magnet 42 in the Z-axis direction, that is, the positions of the base end of the first magnet 41 and the distal end of the second magnet match. The present invention is not limited to this, and as shown in FIG. 22, the first magnet 41 and the second magnet 42 may be disposed to be spaced from each other in the Z-axis direction. In this case, a gap D1 is provided between the first magnet 41 and the second magnet 42, and the first coil 33 need only be located in the magnetic field of the first magnet 41 or the second magnet 42 even at the position of the gap D1. As a result, the electromagnetic force is generated in the energized first coil 33, and thus the first coil 33 can be driven in the Z-axis direction.

Fifth Modification Example

As shown in FIG. 23, the first magnet 41 and the second magnet 42 may have an overlapping portion D2 having overlapping positions in the Z-axis direction. In this case, the first coil 33 is located in the magnetic fields of the first magnet 41 and the second magnet 42, as in each of the embodiments described above. Therefore, since the electromagnetic force is generated in the energized first coil 33, the first coil 33 can be driven in the Z-axis direction. Moreover, as described above, in a case in which the gap D1 is provided between the first magnet 41 and the second magnet 42 or in a case in which the overlapping portion D2 in which the positions of the first magnet 41 and the second magnet 42 overlap in the Z-axis direction is provided, it is preferable to keep the gap D1 and the overlapping portion D2 within an error in an assembly step.

Sixth Modification Example

Figure 24:
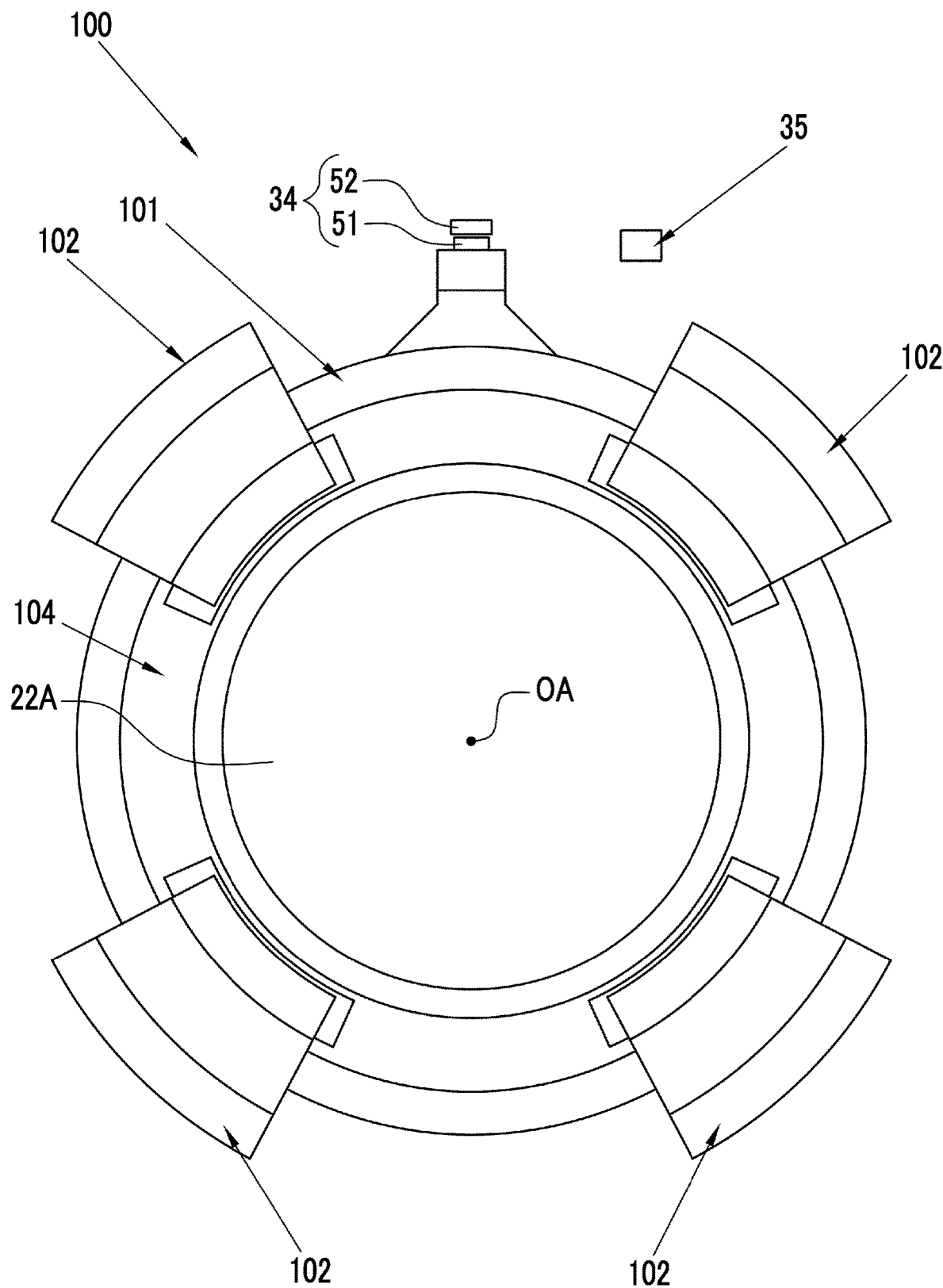
FIG. 24 is a front view of a drive device in a sixth modification example.

In each of the embodiments described above and the modification examples, the first coil 33 is formed in an octagonal shape and the magnetic circuit unit, the yoke, the first magnet, and the second magnet are formed in a flat plate shape. However, the present invention is not limited to this. Similarly to a drive device 100 shown in FIG. 24, the first coil 101 may be formed in a cylindrical shape and a magnetic circuit unit 102 may be formed in an arc shape corresponding to the cylindrical shape of the first coil 101. In this case, the yoke, the first magnet, and the second magnet constituting the magnetic circuit unit 102 are also formed in an arc shape. Moreover, it is preferable that the lens holding member 104 bonded to the first coil 101 also have a cylindrical shape. In the present modification example, the width dimensions of the first magnet and the second magnet can be increased in the circumferential direction of the circle without the influence on the size of the lens barrel, and the thrust can be efficiently improved. Moreover, the thrust can be maintained even in a case in which the yoke is thinned by increasing the width dimensions of the first magnet and the second magnet.

In each of the embodiments described above, the hardware structure of the processing unit that executes various types of processing, such as the lens controller 61 and the camera body controller 71, is various processors as shown below. The various processors include a central processing unit (CPU), which is a general-purpose processor that executes software (program) and functions as various processing units, a graphical processing unit (GPU), a programmable logic device (PLD), which is a processor of which a circuit configuration can be changed after the manufacture, such as a field programmable gate array (FPGA), and a dedicated electric circuit, which is a processor having a circuit configuration specifically designed to execute various types of processing.

One processing unit may be composed of one of these various processors, or may be composed of a combination of two or more same or different types of processors (for example, a plurality of FPGAs, a combination of a CPU and an FPGA, or a combination of a CPU and a GPU). Moreover, a plurality of the processing units may be composed of one processor. As an example in which the plurality of processing units are composed of one processor, first, there is a form in which one processor is composed of a combination of one or more CPUs and software, and this processor functions as the plurality of processing units, as represented by a computer, such as a client or a server. Second, as represented by a system on chip (SoC) or the like, there is a form in which a processor, which realizes the functions of the entire system including the plurality of processing units with a single integrated circuit (IC) chip, is used. In this way, various processing units are composed of one or more of the various processors described above as the hardware structure.

More specifically, the hardware structure of these various processors is an electric circuit (circuitry) in a form of a combination of circuit elements, such as semiconductor elements.

It should be noted that, in each of the embodiments described above, the focus lens 22A is described as an example of the optical system driven by the drive device. However, the present invention is not limited to this, and a drive device that drives another optical system may be applied. Moreover, the optical device according to the embodiment of the present invention can be applied to a lens barrel of a smartphone, a video camera, or the like, in addition to the lens barrel of the digital camera.

EXPLANATION OF REFERENCES

10: digital camera
11: camera body
11A: grip portion
12: lens barrel
13: lens mount
13A: imaging aperture
14: release switch
16: imaging element
17: body-side signal contact
21: lens barrel body
21A: groove
21B: fixing hole
22: imaging optical system
22A: focus lens
22B: zoom lens
23: drive device
24: focus ring
25: lens mount
26: lens-side signal contact
28: lens holding member
28A: cylindrical portion
28B: flange portion
28C: through-hole
28D: sensor holding portion
31A, 31B, 32A, 32B: magnetic circuit unit
33: first coil
34: position detection sensor
35: magnetism suppression member
41: first magnet
42: second magnet
43: first yoke
43A: outer flat plate portion
43B: inner flat plate portion
43C: folded-back portion
43D: installation surface
43E, 43G: open end
43F: protruding portion
43H: recess portion
43L: fixing hole
44: second yoke
44A: recess portion
44B: protruding portion
45: screw member
51: magnetic body
52: magnetic sensor
61: lens controller
62: VCM driver
63: motor driver
64, 65: motor
66: stop unit
66A: stop leaf blade
71: camera body controller
72: shutter unit
73: shutter motor
74: motor driver
75: image memory
76: busline
77: image data processing unit
78: LCD driver
79: image display unit
81: card I/F (interface)
82: memory card
83: AF (autofocus) processing unit
84: AE (automatic exposure) processing unit
90: magnetic circuit unit
91: first yoke
91A: outer flat plate portion
91B: inner flat plate portion
91C: folded-back portion
91D: installation surface
91E, 91G: open end
91F: protruding portion
91H: recess portion
91I, 92L: fixing hole
92: second yoke
92A: outer flat plate portion
92B: inner flat plate portion
92C: folded-back portion
92D: installation surface
92E, 92G: open end
92F: recess portion
92H: protruding portion
95: magnetic circuit unit
96: first yoke
98A, 98B: jig
100: drive device
101: first coil
102: magnetic circuit unit
104: lens holding member
AM1: first movement amount
AM2: second movement amount
D1: gap
D2: overlapping portion OA: optical axis
RM: movement range
W11: width dimension
W12: width dimension

What is claimed is:

1. A drive device that drives an optical system along an optical axis direction of the optical system, the device comprising:
   a base portion including a yoke and a magnet disposed on the yoke; and
   a first coil that is bonded to the optical system and corresponds to the magnet,
   wherein the base portion drives the first coil and the optical system by an electromagnetic force generated in the first coil,
   the base portion includes a first base portion in which a first magnet corresponding to a first movement amount in a movement range of movement of the optical system is disposed and a second base portion in which a second magnet corresponding to a second movement amount in the movement range is disposed, and
   the first coil is disposed to enter a magnetic field of the first magnet at a position corresponding to the first movement amount in the movement range and to enter a magnetic field of the second magnet at positions corresponding to the second movement amount in the movement range, thereby being driven from a distal end to a base end of the movement range.

2. The drive device according to claim 1, wherein the magnet is installed on an inner surface side formed in a bent shape of the yoke.

3. The drive device according to claim 1, wherein lengths of the first magnet and the second magnet in the optical axis direction are shorter than a maximum movement amount of movement of the optical system.

4. The drive device according to claim 1, further comprising:
   a position detection sensor that includes a magnetic body and detects a position of the optical system by magnetism of the magnetic body; and
   a magnetism suppression member that suppresses magnetism of the first magnet and/or the second magnet in a magnetic field of the magnetic body.

5. The drive device according to claim 1, wherein the first base portions are disposed in pairs at positions facing each other with an optical axis interposed therebetween, and the second base portions are disposed in pairs at positions facing each other with the optical axis interposed therebetween.

6. The drive device according to claim 1, wherein the yoke is composed of a plurality of yoke constituent members, and the plurality of yoke constituent members are bonded to each other at a portion other than an end portion of the yoke in the optical axis direction.

7. The drive device according to claim 1, further comprising:
   a support member that supports the yoke,
   wherein the yoke is formed with a fixing hole for fixing the yoke to the support member at a position other than an end portion of the yoke in the optical axis direction.

8. The drive device according to claim 1, further comprising:
   a support member that supports the yoke,
   wherein the yoke is fixed by adhesion to the support member, press-fitting into the support member, or holding by a holding member that is bonded to the support member.

9. The drive device according to claim 1, wherein the first coil has a cylindrical shape, and the yoke and the magnet are formed in an arc shape corresponding to the cylindrical shape.

10. The drive device according to claim 1, wherein the first magnet and the second magnet are disposed to be spaced from each other in the optical axis direction.

11. The drive device according to claim 1, wherein the first magnet and the second magnet have a portion having overlapping positions in the optical axis direction.

12. An optical device comprising:
    the drive device according to claim 1.

* * * * *